(12) United States Patent
Schrammel et al.

(10) Patent No.: US 11,442,845 B2
(45) Date of Patent: Sep. 13, 2022

(54) SYSTEMS AND METHODS FOR AUTOMATIC TEST GENERATION

(71) Applicant: Diffblue Ltd, Oxford (GB)

(72) Inventors: Peter Schrammel, Oxford (GB); Daniel Kroening, Oxford (GB)

(73) Assignee: DIFFBLUE LTD, Oxford (GB)

( * ) Notice: Subject to any disclaimer, the term of this patent is extended or adjusted under 35 U.S.C. 154(b) by 0 days.

(21) Appl. No.: 17/113,784

(22) Filed: Dec. 7, 2020

(65) Prior Publication Data

US 2022/0179776 A1   Jun. 9, 2022

(51) Int. Cl.
G06F 11/36 (2006.01)
G06F 8/75 (2018.01)

(52) U.S. Cl.
CPC ............ *G06F 11/3684* (2013.01); *G06F 8/75* (2013.01); *G06F 11/3688* (2013.01)

(58) Field of Classification Search
CPC ..... G06F 11/3684; G06F 8/75; G06F 11/3688
See application file for complete search history.

(56) References Cited

U.S. PATENT DOCUMENTS

| 2014/0026127 | A1* | 1/2014 | McEwan | G06F 8/37 717/146 |
| 2014/0365830 | A1* | 12/2014 | Rajan | G06F 11/3664 714/38.1 |
| 2019/0384697 | A1* | 12/2019 | Phan | G06F 11/3676 |
| 2021/0141714 | A1* | 5/2021 | Lees | G06F 11/3684 |

FOREIGN PATENT DOCUMENTS

WO   WO-2014027990 A1 *  2/2014  ............. G06F 11/36

\* cited by examiner

*Primary Examiner* — Wei Y Zhen
*Assistant Examiner* — Amir Soltanzadeh
(74) *Attorney, Agent, or Firm* — Dority & Manning, P.A.

(57) ABSTRACT

A computer-implemented method comprising obtaining a first candidate test associated with a testable component, wherein the first candidate test comprises an input having an input value; generating a second candidate test associated with the testable component by performing a dynamic mutation-based fuzzing of the first candidate test, wherein the second candidate test is based on the first candidate test and comprises a modified input value for the input based on data generated during an execution of the first candidate test or domain knowledge associated with the testable component; and creating a test for the testable component based on the first candidate test or the second candidate test.

13 Claims, 19 Drawing Sheets

```
@Test
public void testAddToBalance() throws AccountException {
    Account account = new CurrentAccount(123456L, new User("Alf", "William"));
    account.addToBalance(10L);
    assertTrue("Incorrect balance", account.getBalance() == 10L);
}
```

Figure 2

```
try {
    Runtime.onMethodCall(0x1234, CurrentAccount.class, 123456L);
    Account account = new CurrentAccount(123456L, user);
} catch (Throwable __e) {
    Runtime.onThrow(0x1234, __e);
    throw e;
}
```

Figure 9

```
User user = new User("Eli", "Simon");        (1112)

Account account = new Account(123456L, user);  (1114)

account.addToBalance(10L);                    (1116)
```

SYSTEMS AND METHODS FOR AUTOMATIC TEST GENERATION

FIELD OF INVENTION

Aspects of the present disclosure relate to automatic test generation. In particular, aspects of the present disclosure relate to automatic discovery of a unit test for a procedure based on dynamic fuzzing of input values for a test obtained from dynamic and static program data.

BACKGROUND

Testing plays a pivotal role in software development. Even for relatively small software projects, it is important for stakeholders to obtain assurance that the software being developed achieves a certain level of quality and is free from bugs, errors, defects, or any other issue that may affect normal operation of the software.

In general, testing ascertains whether a software project meets one or more quality criteria. Typically, testing is performed by observing execution of the software and determining whether the observed execution outcome meets or satisfies the quality criteria. Examples of quality criteria include whether the software as a whole functions as intended or expected, whether the software correctly responds to expected and unexpected inputs, and whether the software operates correctly within different environments.

Given the importance of testing within the software development lifecycle, a significant portion of development time and cost is spent on writing, executing, and maintaining tests for a software project. As a result, some large software development projects will utilize a dedicated team tasked solely with testing the software being developed.

However, for many software development teams, consistently and quickly producing high-quality code can increase the cost of a software project. As such, there typically exists a trade-off between delivering software at high speed, delivering high quality software, or delivering the software at low cost. In some circumstances, this trade-off can directly impact the quality of the software being developed. This is particularly the case when the amount of time spent on developing, executing, and maintaining tests is reduced in order to increase the speed of development and thus reduce costs.

Additionally, with large and complex codebases, it is often difficult for a software developer or test engineer to know what will happen to the functionality of the software when code is modified. In order to attempt to address this, unit testing aims to ensure that the code being developed is robust and resilient against accidental behavior changes which could be caused by future code modifications.

Unit tests form the most basic and fundamental level of testing. Unit tests are small tests which are designed to cover individual units of code and make sure each part of a software system functions as intended. As such, unit tests are of fundamental importance to code quality of a software system. However, the effectiveness of unit tests increases with scale—the more unit tests that are created for a software codebase, the more effective those unit tests are.

Therefore, it is highly desirable for developers to ensure that unit tests cover as much of the codebase as possible. However, given the above mentioned trade-off between speed, quality, and cost, writing enough unit tests to provide not only sufficient coverage, but also a high level of protection against any regressions occurring, can consume a large amount of developer time and cost.

Recent studies indicate that many developers spend approximately 20% of their time writing unit tests, and 15% of their time writing other types of test such as regression tests, stress tests, and integration tests. As such, there is a need for tools which aid software developers with the software testing process in order to reduce the time and cost spent on developing, executing, and maintaining tests. In particular, there is a need for automated tools for test generation which provide good coverage and generate tests which appear as if they were written by a human software developer.

Existing tools for automated software generation determine values to be used within a test randomly, or only consider a small subset of possible values. As such, the tests generated by such tools are clearly identifiable as being generated by a machine and not a human user. This then makes incorporation of the test within an existing test suite difficult as the generated tests may not share the same context-specific behavior and/or appearance as tests written by a human software developer.

Accordingly, there is a need for automated tools for test generation which ensure that the generated tests (i) use realistic and useful values, (ii) generate useful assertions; (iii) provide a sufficient level of code coverage, and (iv) correspond to important and interesting test cases.

Therefore, the present disclosure is directed to systems and methods for automatic test generation which aim to address some of the above identified problems.

SUMMARY OF INVENTION

According to an aspect of the present disclosure there is provided a computer-implemented method comprising obtaining a first candidate test associated with a testable component, wherein the first candidate test comprises an input having an input value; generating a second candidate test associated with the testable component by performing a dynamic mutation-based fuzzing of the first candidate test, wherein the second candidate test is based on the first candidate test and comprises a modified input value for the input based on data generated during an execution of the first candidate test or domain knowledge associated with the testable component; and creating a test for the testable component based on the first candidate test or the second candidate test.

Beneficially, the dynamic mutation-based fuzzing approach performed by the present disclosure enables realistic, context dependent, test values to be identified and incorporated within automatically generated tests. Advantageously, the test values are determined from both dynamic and static data, and thus incorporate values which are specific to the context of the software being tested as well as values discovered as a result of execution. The tests generated by the computer-implemented method of the present disclosure have characteristics which make the tests more useful to a programmer—they utilize useful values, they cover useful test cases, and they appear as if they have been created by a human user.

In this way, the present disclosure presents an improved computer-implemented method that can automatically develop software tests for a number of functions of a software program. This, in turn, improves the functioning of computing systems, in general, by reducing the time, cost, and computing resources devoted to software testing, while efficiently and cost effectively increasing code coverage afforded by software tests. Ultimately, the testing techniques disclosed herein result in more accurate and sustainable software program testing; thereby improving computer-implemented testing methods and software programs in general. Thus, aspects of the present disclosure provide an improvement to computing technology.

According to a further aspect of the disclosure there is provided a computer-implemented method comprising: obtaining a prioritized list of candidate input values, wherein the prioritized list of candidate input values includes at least one candidate input value based on domain knowledge associated with a testable component. The computer-implemented method further comprises updating the prioritized list of candidate input values by: obtaining a first candidate test associated with the testable component, wherein the first candidate test comprises an input having an input value; causing an execution of the first candidate test and recording data generated during the execution of the first candidate test; determining a candidate input value based on the data generated during the execution of the first candidate test; adding the candidate input value to the prioritized list of candidate input values according to a priority value associated with the candidate input value; and modifying the first candidate test to create a second candidate test based on the first candidate test, the second candidate test including a modified input value different to a corresponding input value of the first candidate test, wherein the modified input value is selected from the prioritized list of candidate input values. The computer-implemented method further comprises generating a test associated with the testable component based on the first candidate test or the second candidate test.

Beneficially, the generation of tests based on static data and dynamic data discovered during execution of a dynamic mutation-based fuzzing process provides an improved automatic test generation method. Realistic (i.e., context-aware) and useful input values are automatically and efficiently discovered and incorporated into generated tests. As the tests are generated from the domain knowledge and the data generated during execution the tests are specific and useful to the software being tested. In this way, the computer-implemented method accumulates and utilizes newly available information such as, for example, domain knowledge and dynamic analysis data to provide a practical improvement to software testing technology. Moreover, the computer-implemented method makes efficient use of data generated during execution by guiding the dynamic mutation-based fuzzing process based on a dynamic prioritization of candidate input values such that higher priority candidate input values are explored and potentially incorporated into automatically generated tests.

In this way, the present disclosure presents an improved computer-implemented method that can automatically develop software tests for a number of functions of a software program. This, in turn, improves the functioning of computing systems, in general, by reducing the time, cost, and computing resources devoted to software testing, while efficiently and cost effectively increasing code coverage afforded by software tests. Ultimately, the testing techniques disclosed herein result in more accurate and sustainable software program testing; thereby improving computer-implemented testing methods and software programs in general. Thus, aspects of the present disclosure provide an improvement to computing technology.

Optionally, but preferably, the domain knowledge associated with the testable component includes analysis data associated with a first codebase and analysis data associated with a second codebase, wherein the first codebase includes the testable component.

Optionally, but preferably, the computer-implemented method further comprises performing a static analysis of the first codebase to determine analysis data associated with the first codebase.

Optionally, but preferably, the computer-implemented method further comprises determining one or more candidate literal values and one or more candidate implementation types based on the analysis data associated with the first codebase. The modified input value is further based on the one or more candidate literal values or the one or more candidate implementation types determined from the analysis data associated with the first codebase.

Optionally, but preferably, the computer-implemented method further comprises performing an offline static analysis of the second codebase to determine offline analysis data associated with the second codebase.

Optionally, the computer-implemented method further comprises determining one or more candidate literal values and one or more candidate implementation types based on the offline analysis data associated with the second codebase. The modified input value is further based on the one or more candidate literal values or the one or more candidate implementation types determined from the offline analysis data associated with the second codebase.

Optionally, but preferably, causing the execution of the first candidate test and recording data generated during the execution of the first candidate test further comprises instrumenting a first code section associated with the testable component to determine a first instrumented code section, wherein the first instrumented code collects and records data generated during the execution of the first candidate test.

Optionally, but preferably, the computer-implemented method further comprises, prior to adding the candidate input value to the prioritized list of candidate input values determining the priority value associated with the candidate input value.

Optionally, the priority value is based on the data generated during the execution of the first candidate test and/or the domain knowledge associated with the testable component.

Optionally, but preferably, the computer-implemented method further comprises repeating the steps of updating and generating until a termination criterion is met.

According to a further aspect of the disclosure, there is provided a system comprising one or more processors and one or more transitory, or non-transitory, computer-readable media that collectively store instructions that, when executed by the one or more processors, cause the system to perform operations, the operations comprising: obtaining a prioritized list of candidate input values, wherein the prioritized list of candidate input values includes at least one candidate input value based on domain knowledge associated with a testable component; obtaining a first candidate test associated with the testable component, wherein the current candidate test comprises an input having an input value; causing an execution of the first candidate test and recording data generated during the execution of the first candidate test; determining a candidate input value based on the data generated during the execution of the first candidate test; adding the candidate input value to the prioritized list of candidate input values according to a priority value associated with the candidate input value; modifying the first candidate test to create a second candidate test based on the first candidate test, the second candidate test including a modified input value different to a corresponding input value of the first candidate test, wherein the modified input value is selected from the prioritized list of candidate input values; and generating a test associated with the testable component based on the first candidate test or the second candidate test.

Beneficially, the generation of tests based on static data and dynamic data discovered during execution of a dynamic mutation-based fuzzing process provides an improved and more realistic automatic test generation method. Realistic and useful input values are automatically and efficiently discovered and incorporated into generated tests. In this way, the computer-implemented method accumulates and utilizes newly available information such as, for example, domain knowledge and dynamic analysis data to provide a practical improvement to software testing technology. Moreover, the computer-implemented method makes efficient use of data generated during execution by guiding the dynamic mutation-based fuzzing process based on a dynamic prioritization of candidate input values such that higher priority candidate input values are explored and potentially incorporated into automatically generated tests.

In this way, the present disclosure presents an improved system that can automatically develop software tests for a number of functions of a software program. This, in turn, improves the functioning of computing systems, in general, by reducing the time, cost, and computing resources devoted to software testing, while efficiently and cost effectively increasing code coverage afforded by software tests. Ultimately, the testing techniques disclosed herein result in more accurate and sustainable software program testing; thereby improving systems and software programs in general. Thus, aspects of the present disclosure provide an improvement to computing technology.

Optionally, but preferably, the operations further comprise determining the domain knowledge associated with the testable component, wherein the domain knowledge associated with the testable component includes analysis data associated with a first codebase including the testable component and analysis data associated with a second codebase Optionally, but preferably, the operations further comprise performing a static analysis of the first codebase to determine analysis data associated with the first codebase, and determining one or more candidate literal values and one or more candidate implementation types based on the analysis data associated with the first codebase. The modified input value is further based on the one or more candidate literal values or the one or more candidate implementation types determined from the analysis data associated with the first codebase.

Optionally, but preferably, the operations further comprise performing an offline static analysis of the second codebase to determine offline analysis data associated with the second codebase, and determining one or more candidate literal values and one or more candidate implementation types based on the offline analysis data associated with the second codebase. The modified input value is further based on the one or more candidate literal values or the one or more candidate implementation types determined from the offline analysis data associated with the second codebase.

Optionally, but preferably, the operations further comprise instrumenting a first code section associated with the testable component to determine a first instrumented code section, wherein the first instrumented code collects and records data generated during the execution of the first candidate test.

Optionally, the test is generated based on the first candidate test in accordance with a determination that the first candidate test satisfies a criterion.

Optionally, the test is generated based on the second candidate test in accordance with a determination that the second candidate test satisfies a criterion.

Optionally, but preferably, the operations further comprise determining the priority value associated with the candidate input value, wherein the priority value is based on the data generated during the execution of the first candidate test and/or the domain knowledge associated with the testable component.

There is also provided a transitory, or non-transitory, computer readable medium comprising one or more instructions which when executed by one or more processors cause the device to carry out one or more operations, the operations comprising obtaining a prioritized list of candidate input values, wherein the prioritized list of candidate input values includes at least one candidate input value based on domain knowledge associated with a testable component; obtaining a first candidate test associated with the testable component, wherein the current candidate test comprises an input having an input value; causing an execution of the first candidate test and recording data generated during the execution of the first candidate test; determining a candidate input value based on the data generated during the execution of the first candidate test; adding the candidate input value to the prioritized list of candidate input values according to a priority value associated with the candidate input value; modifying the first candidate test to create a second candidate test based on the first candidate test, the second candidate test including a modified input value different to a corresponding input value of the first candidate test, wherein the modified input value is selected from the prioritized list of candidate input values; and generating a test associated with the testable component based on the first candidate test or the second candidate test.

Beneficially, the generation of tests based on static data and dynamic data discovered during execution of a dynamic mutation-based fuzzing process provides an improved and more realistic automatic test generation method. Realistic and useful input values are automatically and efficiently discovered and incorporated into generated tests.

BRIEF DESCRIPTION OF DRAWINGS

Embodiments of the invention will now be described, by way of example only, and with reference to the accompanying drawings, in which:

FIG. 2 shows a source code listing of a software unit test according to an embodiment;

FIG. 9 shows a snippet of an instrumented candidate test according to an embodiment;

FIG. 11 shows an arrange section and an act section of a candidate test according to an embodiment;

DETAILED DESCRIPTION

Figure 1:
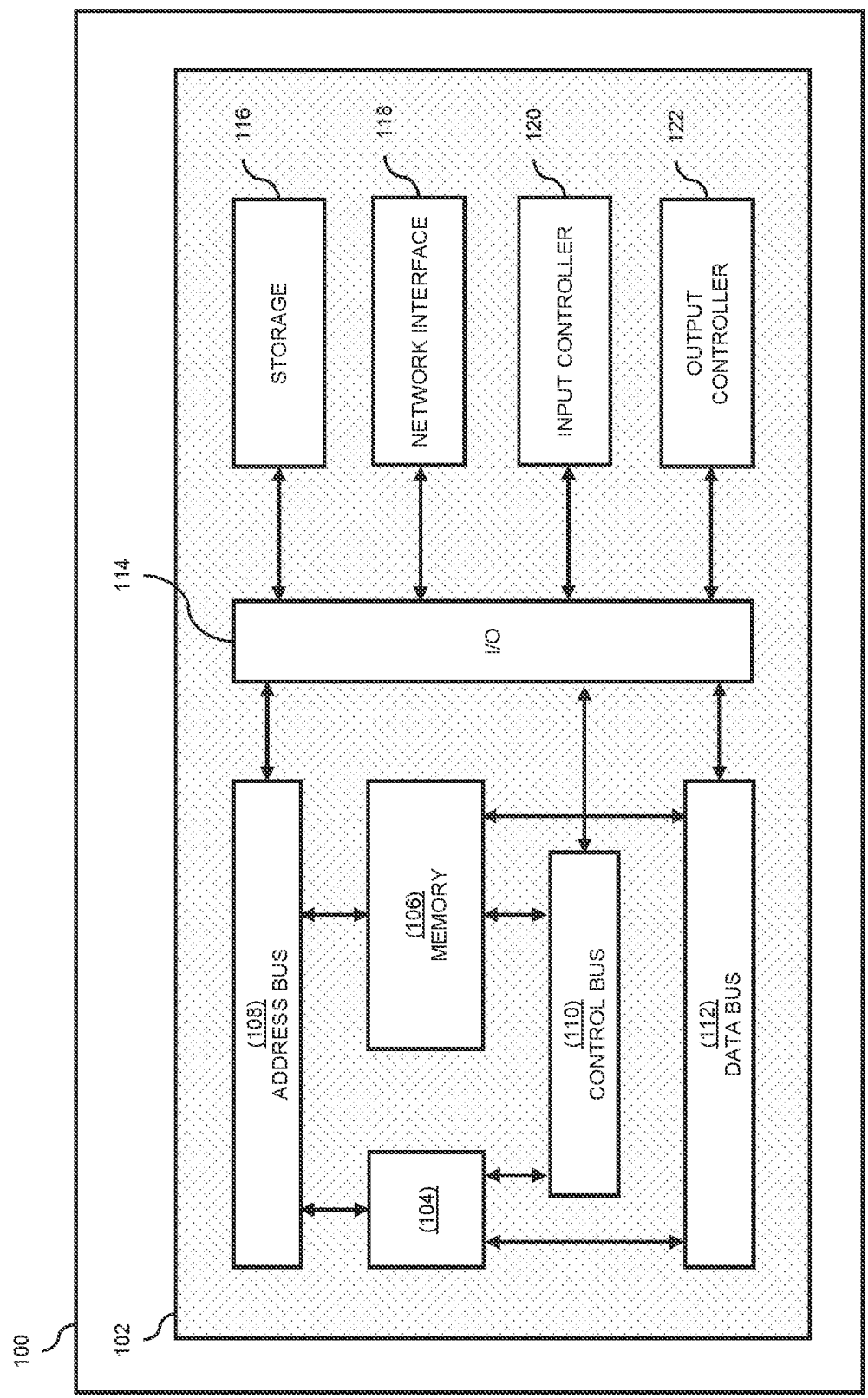
FIG. 1 shows an example computing system for automatic test generation according to an embodiment.

Embodiments of the present disclosure will be now described with reference to the attached figures. It is to be noted that the following description is merely used for enabling the skilled person to understand the present disclosure, without any intention to limit the applicability of the present disclosure to other embodiments which could be readily understood and/or envisaged by the reader. In particular, whilst the present disclosure is primarily directed to the automatic generation of a unit test, the skilled person will readily appreciate that the systems, methods, and devices of the present disclosure are applicable to other areas of software and test development.

In the present disclosure, references to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. The use of any and all examples, or exemplary language ("e.g.," "such as," "including," or the like) provided herein, is intended merely to better illuminate the embodiments and does not pose a limitation on the scope of the embodiments or the claims.

For consistency and ease of reference, the present disclosure is described primarily in relation to the Java programming language. However, the skilled person will appreciate that the systems and methods of the present disclosure are not limited as such. Indeed, the systems and methods of the present disclosure are applicable to any suitable programming language or environment, including but not limited to Java, C, C++, any suitable assembly language, Python, C #, JavaScript, Ruby, PHP, and the like.

Some embodiments described herein may relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a transitory computer program product, which can include, for example, the instructions and/or computer code discussed herein.

Some embodiments and/or methods described herein can be performed by software (executed on hardware), hardware, or a combination thereof. Hardware modules include, for example, a general-purpose processor, a field programmable gate array (FPGA), and/or an application specific integrated circuit (ASIC). Software modules (executed on hardware) can be expressed in a variety of software languages (e.g., computer code), including C, C++, Java, Ruby, Visual Basic, Python, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

A computing environment for automatic test generation where the devices, systems, and methods discussed herein may be utilized will now be described.

FIG. 1 shows an example computing system for automatic test generation. Specifically, FIG. 1 shows a block diagram of an embodiment of a computing system according to example embodiments of the present disclosure.

Computing system 100 can be configured to perform any of the operations disclosed herein such as, for example, any of the operations discussed with reference to the functional units described in relation to FIG. 3. Computing system includes one or more computing device(s) 102. Computing device(s) 102 of computing system 100 comprise one or more processors 104 and memory 106. One or more processors 104 can be any general purpose processor(s) configured to execute a set of instructions. For example, one or more processors 104 can be one or more general-purpose processors, one or more field programmable gate array (FPGA), and/or one or more application specific integrated circuits (ASIC). In one embodiment, one or more processors 104 include one processor. Alternatively, one or more processors 104 include a plurality of processors that are operatively connected. One or more processors 104 are communicatively coupled to memory 106 via address bus 108, control bus 110, and data bus 112. Memory 106 can be a random access memory (RAM), a read-only memory (ROM), a persistent storage device such as a hard drive, an erasable programmable read-only memory (EPROM), and/or the like. Computing device(s) 102 further comprise I/O interface 114 communicatively coupled to address bus 108, control bus 110, and data bus 112.

Memory 106 can store information that can be accessed by one or more processors 104. For instance, memory 106 (e.g., one or more non-transitory computer-readable storage mediums, memory devices) can include computer-readable instructions (not shown) that can be executed by one or more processors 104. The computer-readable instructions can be software written in any suitable programming language or can be implemented in hardware. Additionally, or alternatively, the computer-readable instructions can be executed in logically and/or virtually separate threads on one or more processors 104. For example, memory 106 can store instructions (not shown) that when executed by one or more processors 104 cause one or more processors 104 to perform operations such as any of the operations and functions for which computing system 100 is configured, as described herein. In addition, or alternatively, memory 106 can store data (not shown) that can be obtained, received, accessed, written, manipulated, created, and/or stored. The data can include, for instance, the data and/or information described herein in relation to FIGS. 3 to 12. In some implementations, computing device(s) 102 can obtain from and/or store data in one or more memory device(s) that are remote from the computing system 100.

Computing system 100 further comprises storage unit 116, network interface 118, input controller 120, and output controller 122. Storage unit 116, network interface 118, input controller 120, and output controller 122 are communicatively coupled to central control unit or computing devices 102 via I/O interface 114.

Storage unit 116 is a computer readable medium, preferably a non-transitory computer readable medium, comprising one or more programs, the one or more programs comprising instructions which when executed by processor (CPU) 104 cause computing system/environment 100 to perform the method steps of the present disclosure. Alternatively, storage unit 116 is a transitory computer readable medium. Storage unit 116 can be a persistent storage device such as a hard drive, a cloud storage device, or any other appropriate storage device.

Network interface 118 can be a Wi-Fi module, a network interface card, a Bluetooth module, and/or any other suitable wired or wireless communication device. In an embodiment, network interface 118 is configured to connect to a network such as a local area network (LAN), or a wide area network (WAN), the Internet, or an intranet.

FIG. 1 illustrates one example computer system 100 that can be used to implement the present disclosure. Other computing systems can be used as well. Computing tasks discussed herein as being performed at and/or by one or more functional unit(s) (e.g., as described in relation to FIG. 3) can instead be performed remote from the respective system, or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

The present disclosure relates to the automatic generation of a unit test for a procedure or method. Therefore, before describing the systems and methods of the present disclosure in detail, the anatomy of a unit test will be described by way of the example shown in FIG. 2.

FIG. 2 shows an example of source code listing 200 of a software unit test.

Source code listing 200 comprises Java code statements 202, 204, 206 wrapped within a procedure. Whilst source code listing 200 is shown in the Java programming language, the skilled person will appreciate that the present disclosure is not limited solely to the Java programming language, nor is it limited solely to a particular programming paradigm such as object-oriented programming. Indeed, the present disclosure is applicable to any suitable compiled or interpretive programming or scripting language including but not limited to Java, C, C++, any suitable assembly language, Python, C #, JavaScript, Ruby, PHP, and the like.

Source code listing 200 in an embodiment corresponds to a unit test for the example procedure addToBalance( ) where each code statement 202, 204, 206 corresponds to a distinct section of the test. addToBalance( ) is presented only by way of example and any other procedure may be used. Specifically, source code listing 200 is written according to the Arrange-Act-Assert design pattern. The arrange section corresponds to code statement 202, the act section corresponds to code statement 204, and the assert section corresponds to code statement 206. The unit test shown in source code listing 200 is written in the JUnit framework. The skilled person will appreciate that the present disclosure is not limited to the JUnit framework and any other suitable testing framework or methodology, such as TestNG, Spock, and the like can be used.

When source code listing 200 is run, either independently or as part of a larger test suite, the call to the procedure testAddToBalance( ) will result in each code statement 202, 204, 206, or section of the Arrange-Act-Assert design pattern, being executed. In further examples other procedures may be used which cause the execution of the code statements or section of the Arrange-Act-Assert design pattern. Arrange section 202 creates the objects and/or values necessary for act section 204 to be executed. Execution of act section 204 corresponds to invoking the procedure under test. The result of executing act section 204 is then verified in assert section 206. If assert section 206 determines that act section 204 performed as expected, then the test is deemed to have passed; otherwise, the test is deemed to have failed.

Arrange section 202 provides the instructions necessary to set up the invocation of the procedure under test—addToBalance( ). In the example shown in source code listing 200, arrange section 202 creates new Account object 208 in order to set up the invocation of addToBalance( ) which is an instance method of the Account class. The constructor of the Account class requires two parameters 210A, 210B. Parameter 210A corresponds to an account number, and parameter 210B corresponds to a User object linked to the Account object being created. The constructor of the User class takes two further parameters corresponding to the first name and the second name of the user.

Act section 204 invokes procedure 212, which is the method or procedure under test. In the example shown in source code listing 200, act section 204 comprises a single invocation of procedure 212, addToBalance( ) which is a method of Account object 208 created in arrange section 202. Invocation of procedure 212 within act section 204 requires parameter 214 corresponding to the amount to be added to the balance of Account object 208.

Assert section 206 determines whether the expected outcome of act section 204 has occurred. In the example shown in source code listing 200, Account object 208 is created in arrange section 202 with an initial balance of "0". The balance of Account object 208 is incremented by "10" in act section 204. Therefore, assert section 206 determines whether the balance of Account object 208 after execution of act section 204 is equal to the value "10", as shown by Boolean expression 216 which forms part of the assertTrue( ) method of the JUnit framework. Whilst assert section 206 utilizes assertTrue( ) the skilled person will appreciate that any other suitable method to express an assertion in JUnit or any other test framework such as TestNG can be used. Alternatively, an assertion framework such as Hamcrest, AssertJ, and the like can be used. If Boolean expression 216 evaluates to "True", then the outcome of act section 204 is as expected and the test passes. If Boolean expression 216 evaluates to "False", then the outcome of act section 204 is not as expected and the test fails.

Beneficially, the use of the Arrange-Act-Assert design pattern allows clear separation between what is being tested (the Act section), from the setup (the Arrange section) and verification (the Assert section). Although the steps are separated, there is a dependency and relationship between arrange section 202, act section 204, and assert section 206. Specifically, assert section 206 requires correct invocation of act section 204 which, in turn, requires correct setup of the necessary objects, variables, and values in arrange section 202.

Throughout the present disclosure, tests will be described within the framework of the Arrange-Act-Assert design pattern primarily for ease of reference. The skilled person will understand that such a description is not intended to limit the present disclosure only to tests structured according to this pattern. Even in cases where the test being generated does not directly follow the Arrange-Act-Assert design pattern, it is still helpful to determine how the procedure under test can be invoked, and also what values to use, either as part of the setup, or as arguments to the procedure under test.

An example aspect of automatic test generation is the determination of suitable values for inclusion in the test. This includes determining values which correspond to values which a software developer or programmer would be expected to use within a unit test. That is, the values determined by the automatic test generation process appear as though they have been written by a software developer or programmer. This aspect can include using values which have contextual or domain-specific meaning to the codebase from which the method under test is taken. This aspect can also include avoiding the use of values which appear as though they were merely randomly generated. Furthermore, it is beneficial to determine values which result in a broad coverage of the method under test being achieved. This helps to ensure that a wide range of useful tests are automatically generated which cover useful test scenarios. In this context, suitable values can refer to both literal values appearing within the test, and implementation types used within the test.

The systems and methods of the present disclosure automatically generate a test from static data, and from dynamic data discovered by a dynamic mutation-based fuzzing process. The systems and methods of the present disclosure efficiently search the space of possible input values in order to identify candidate input values which can be included in a test in order to generate a test which both appears as though written by a human software developer and provides a useful, non-trivial test scenario. This can improve efficiency of generating an effective test that will produce a useable result and can help reduce the processing and memory resources needed to repeatedly refine scenario selection and test generation.

Figure 3:
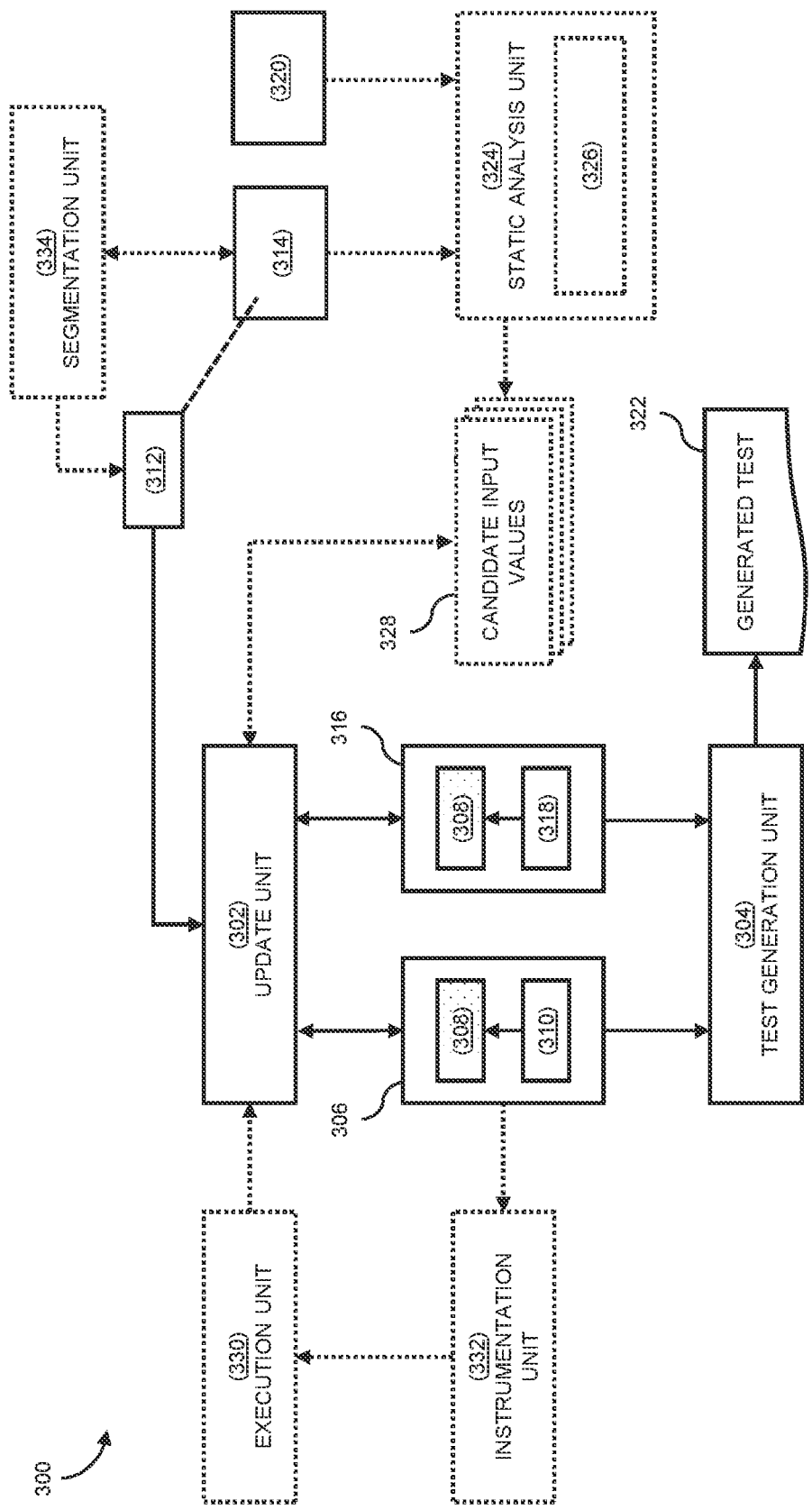
FIG. 3 shows a system for automatic test generation according to an aspect of the present disclosure.

FIG. 3 shows system 300 for automatic test generation according to an embodiment of the present invention.

System 300 comprises update unit 302 and test generation unit 304. Update unit 302 is configured to obtain first candidate test 306 comprising input 308 having input value 310. First candidate test 306 is associated with testable component 312. Preferably, first candidate test 306 corresponds to an executable part of a test for testable component 312. For example, a candidate test, such as first candidate test 306, can comprise an arrange section and an act section of a unit test (as described in relation to FIG. 2). Optionally, a candidate test can further comprise an assert section comprising an assertion. As such, first candidate test 306 preferably comprises executable code associated with at least a part of a unit test for testable component 312. Preferably, testable component 312 corresponds to a block of code (e.g., a method or procedure) within first codebase 314 for which a test is to be generated.

First candidate test 306 comprises input 308 having input value 310. Here, input value 310 may refer to a literal value associated with input 308, or an implementation type associated with input 308. Preferably, input 308 corresponds to a modifiable part or element of first candidate test 306 to which input value 310 can be assigned. For example, an input may be associated with a variable assignment and the input value may be the literal value assigned to the variable. Alternatively, an input and input value may be associated with an implementation type of an interface, abstract class, parent class, and the like. As such, the input value preferably comprises a literal value or an implementation type. In a further embodiment, an input is associated with a method call.

Update unit 302 is further configured to generate second candidate test 316 associated with testable component 312. Second candidate test 316 is generated by a dynamic mutation-based fuzzing of first candidate test 306. Dynamic mutation-based fuzzing is a process whereby the input values of a first candidate test are mutated based at least in part on data obtained during execution of the first candidate test or domain knowledge associated with the testable component. The mutated input values can then be utilized to generate a second candidate test.

For example, consider a candidate test comprising an input corresponding to the parameter, param, of a method addToBalance(param). The input of the candidate test has an input value, −1. During execution of the candidate test, data is obtained from the execution indicating that the parameter of the method cannot be negative. This data can be used to mutate the input value of the candidate test, e.g., increment the input value by 1, to generate a new candidate test having the mutated input value, e.g., addToBalance(0). The new candidate test can then be further mutated in subsequent executions of the dynamic fuzzing process to generate further candidate tests.

As such, second candidate test 316 is based on first candidate test 306 and comprises modified input value 318 for input 308. Modified input value 318 is based on data generated during an execution of first candidate test 306 or domain knowledge associated with testable component 312. This domain knowledge is determined from analysis data identified from first codebase 314 and/or analysis data identified from second codebase 320. First codebase 314 comprises testable component 312. As such, the domain knowledge incorporates context-specific data relevant to testable component 312. Preferably, second codebase 320 does not contain a copy of the testable component. In an embodiment, domain knowledge extracted from a plurality of codebases is used to determine a modified input value of a second candidate test.

Test generation unit 304 is configured to generate test 322 for testable component 312 based on first candidate test 306 or second candidate test 316. Preferably, test 322 is a unit test. In an embodiment, test generation unit 304 is configured to apply a criterion when generating test 322 to determine whether to generate test 322 based on first candidate test 306 or second candidate test 316.

As such, system 300 generates test 322 for testable component 312 based on dynamic analysis data and/or domain knowledge associated testable component 312.

The dynamic mutation-based fuzzing approach described above discovers candidate input values for use within a test by dynamically prioritizing candidate input values generated during execution and candidate input values generated from domain data. Unlike random fuzzing techniques, dynamic mutation-based fuzzing efficiently searches the space of candidate input values in order to identify candidate input values which may lead to realistic and useful tests being generated. Therefore, the tests automatically generated by the present disclosure have the benefit of appearing to a user of the system as though they are written by a human software developer whilst achieving broad coverage of the testable component.

Figure 4:
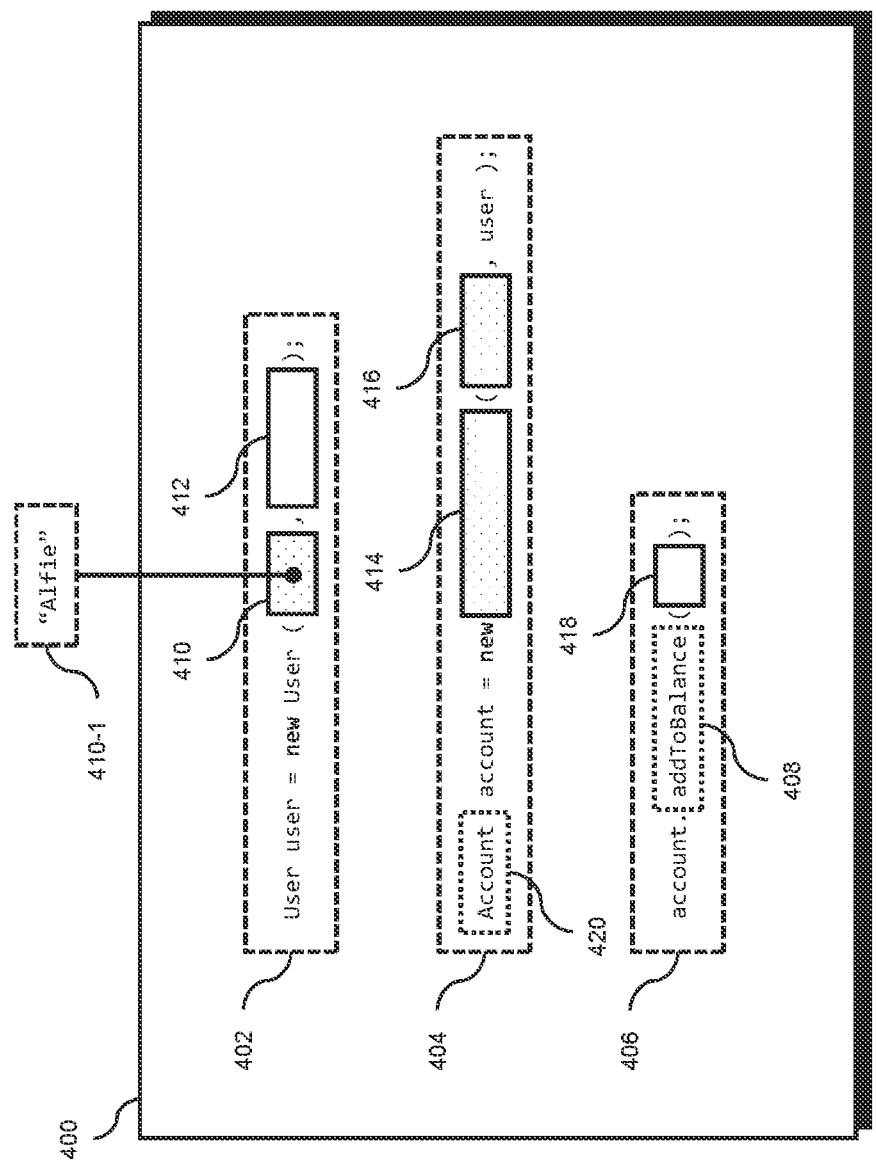
FIG. 4 illustrates the components of a candidate test according to an embodiment.

FIG. 4 illustrates the components of a candidate test according to an embodiment.

FIG. 4 shows candidate test 400 according to one embodiment. Whilst candidate test 400 is shown in the Java programming language, the skilled person will appreciate that the present disclosure is not limited solely to the Java programming language, nor is it limited solely to a particular programming paradigm such as object-oriented programming. Indeed, the present disclosure is applicable to any suitable compiled or interpretive programming or scripting language including but not limited to Java, C, C++, any suitable assembly language, Python, C #, JavaScript, Ruby, PHP, and the like.

Candidate test 400 comprises code statements 402, 404, 406 which when executed invoke method 408. As such, method 408 is a testable component and corresponds to the method under test (i.e., the method for which a test is to be generated). Candidate test 400 may be considered as containing a harness around the code to be tested. That is, candidate test 400 comprises code statements 402, 404 which set up the objects and values necessary to call method 408 within code statement 406. As such, candidate test 400 may be considered to contain an arrange section and an act section according to the Arrange-Act-Assert design pattern, where the arrange section (i.e., code statements 402, 404) sets up the relevant objects and values, and the act section (i.e., code statement 406) calls the method under test based on the setup performed within the arrange section. For ease of reference, throughout the following disclosure, code statements 402, 404, 406 are referred to as a harness, which is to be understood as the code associated with setting up an invocation of the testable component. In the example shown in FIG. 4, the harness refers to the code statements used to call method 408.

Candidate test 400 further comprises inputs 410, 412, 414, 416, 418. The inputs of a candidate test, such as inputs 410, 412, 414, 416, 418 may alternatively be referred to as elements or modifiable elements. Inputs 410, 412 are associated with code statement 402. Inputs 414, 416 are associated with code statement 404. Input 418 is associated with code statement 406. Each input 410, 412, 414, 416, 418 is associated with an input vale. The input value associated with an input may alternatively be referred to as an element value or a modifiable element value. An input value can be a literal value or an implementation type. For example, input 410 is associated with literal value 410-1, "Alfie", which corresponds to the forename of a user, whereas input 414 is associated with an implementation type which is a concrete implementation of Account abstract class 420. Optionally, a literal value associated with an input is associated with an implementation type (e.g., literal value 410-1 may be associated with the implementation type String). In a further embodiment, an input value can be a method call. Whilst candidate test 400 comprises a plurality of inputs and input values, a candidate test preferably comprises at least one input having an associated and modifiable implementation type or an associated and modifiable literal value.

Therefore, candidate test 400 is modifiable by changing the literal values and/or implementation types associated with inputs 410, 412, 414, 416, 418. In one embodiment, changing a literal value comprises changing the literal value and changing the implementation type of the literal value. Once candidate test 400 has been determined, the other elements of candidate test 400 remain static. As such, whilst candidate test 400 in FIG. 4 comprises a harness, inputs, and input values, in an alternative embodiment a candidate test comprises only the input values associated with the inputs. In such an embodiment, a candidate test can be executed by applying the input values to the corresponding inputs of the harness within an execution environment (as described in more detail below). The harness and inputs therefore represent a form of test template to which the input values are applied to generate an executable candidate test. For ease of reference, throughout the present disclosure a candidate test is assumed to comprise a harness, inputs, and input values unless otherwise stated.

In an embodiment, prior to the dynamic mutation-based fuzzing procession being executed, the harness of an initial candidate test is generated using domain knowledge associated with the testable component. Optionally, the inputs associated with initial candidate test are also identified. With reference once again to FIG. 3, the domain knowledge is preferably determined from analysis data associated with first codebase 314 and/or analysis data associated with second codebase 320. Preferably, the analysis data comprises static analysis data.

In an embodiment, system 300 further comprises static analysis unit 324. Static analysis unit 324 is configured to perform a static analysis of first codebase 314 to determine analysis data associated with first codebase 314. Furthermore, static analysis unit 324 is configured to perform a static analysis of second codebase 320 to determine analysis data associated with second codebase 320. Preferably, the static analysis of second codebase 320 comprises an offline static analysis. As such, static analysis unit 324 determines domain knowledge from different codebases by analyzing the source code within the codebases without performing an execution of the codebases or any subpart thereof.

Generally, static analysis, as performed by static analysis unit 324, analyzes the source code within a codebase, such as first codebase 314 or second codebase 320, to determine domain knowledge which can be used to generate the harness, inputs, and possible input values of a candidate test. This domain knowledge captures context information relevant to testable component 312. Domain knowledge can come from either the codebase containing the testable component (e.g., first codebase 314), or from one or more other codebases which do not contain the testable component (e.g., second codebase 320). This latter form of domain knowledge may be referred to as offline domain knowledge. Preferably, domain knowledge includes but is not limited to: (i) literal values represented as constants within the source code; (ii) implementation types used for an interface, abstract class, parent class, and the like; and (iii) code statements associated with invoking a method or code block. The extraction of each of these types of domain knowledge is described in detail below.

Figure 5A:
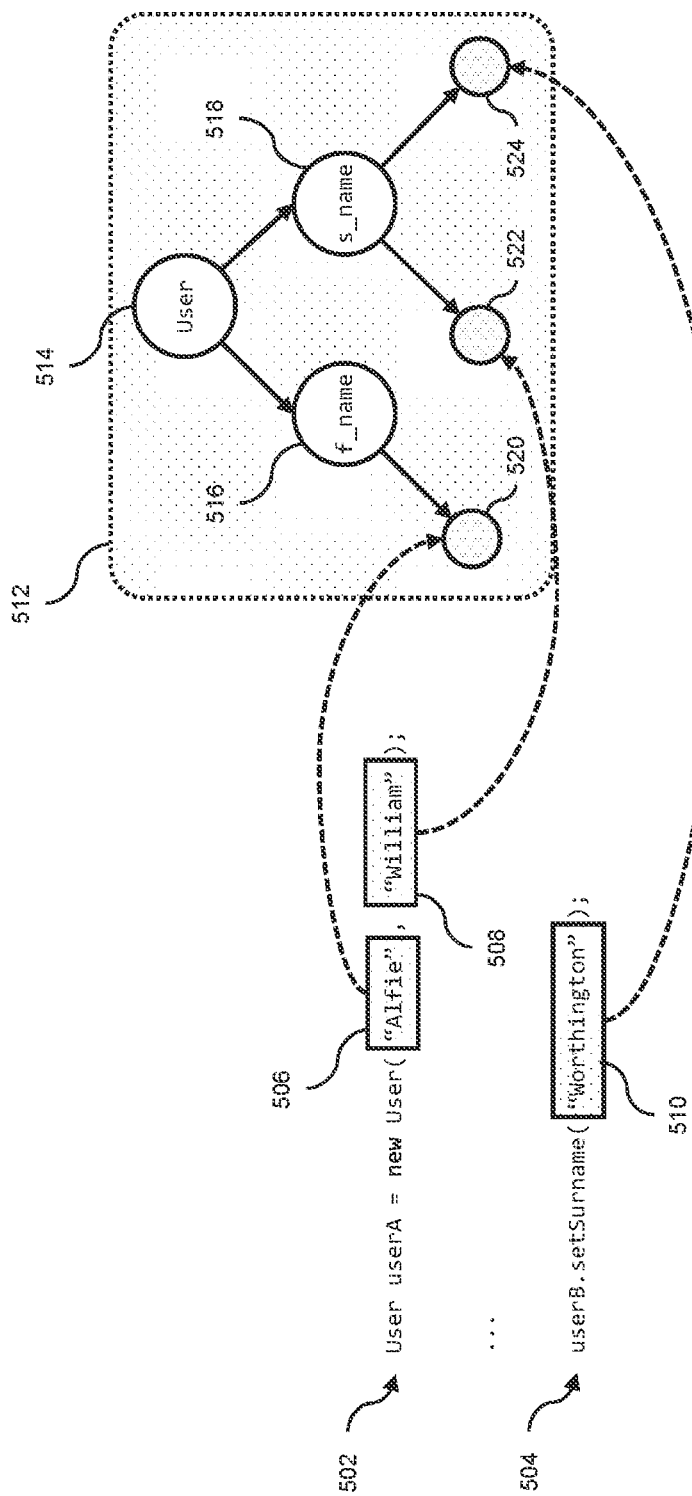
FIGS. 5A and 5B illustrate static analysis of source code to identify domain knowledge according to an embodiment.
Figure 5B:
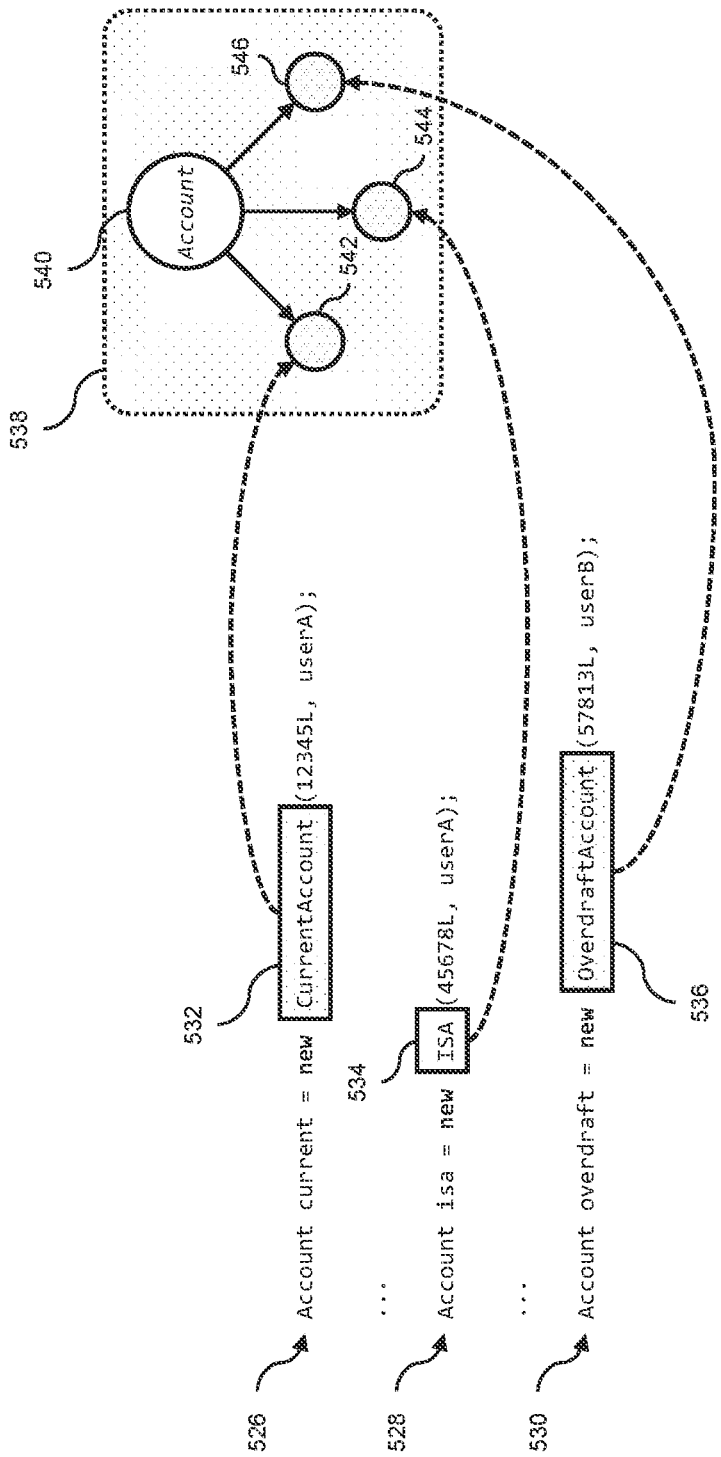

FIGS. 5A and 5B illustrate static analysis of source code to identify domain knowledge. FIG. 5A illustrates the process of performing static analysis to extract literal values represented as constants within the source code, whereas FIG. 5B illustrates the process of performing static analysis to extract implementation types for interfaces, abstract classes, parent classes, and the like.

FIG. 5A illustrates the process of performing static analysis to extract literal values represented as constants within the source code. FIG. 5A shows code statements 502, 504. Code statement 502 corresponds to a call to the constructor of the User class to instantiate a User object userA. The constructor of the User class requires a first argument corresponding to the user's forename, and a second argument corresponding to the user's surname. In code statement 502, first argument is assigned first literal value 506 and second argument is assigned second literal value 508. Code statement 504 corresponds to a call to a setter method of the User class, which assigns the surname of the userB object to that provided by third literal value 508. First literal value 506, second literal value 508, and third literal value 510 are of type String.

A static analysis unit, such as static analysis unit 324 of FIG. 3, can extract and store literal values represented as constants from code statements within a codebase. As such, a static analysis unit, such as static analysis unit 324, is configured to parse a code statement and determine any literal values, as well as their implementation type, represented as constants within the code statement. Preferably, a static analysis unit is further configured to extract contextual information related to the literal values. The literal values extracted and stored can be subsequently used to generate possible literal values for candidate tests. In the example shown in FIG. 5A, the literal values extracted correspond to domain knowledge related to User objects.

For example, code statement 502 comprises two literal values 506, 508 represented as constants. Literal values 506, 508 are provided as two arguments to the User class constructor, and thus the contextual information related to literal values 506, 508 indicates that first literal value 506 corresponds to the user's forename and second literal value 508 corresponds to the user's surname (as determined, for example, from the signature and code body of the User class constructor). For code statement 508, third literal value 510 is provided as an argument to the setSurname method of the User class, and thus the contextual information related to third literal value 510 indicates that third literal value 510 corresponds to the user's surname (as determined from the signature and code body of the setSurname method).

The literal values and contextual information can be represented graphically by graph 512 which links the attributes of a class to literal values determined from constants within a codebase. Graph 512 comprises root node 514, interior nodes 516, 518, and leaf nodes 520, 522, 524. Root node 514 is associated with the User class, and interior nodes 516, 518 are associated with attributes of the User class. Leaf node 520 is associated with a literal value of the attribute associated with interior node 516 identified from a constant used within a codebase. That is, leaf node 520 is associated with first literal value 506 of the forename attribute of the User class identified from code statement 502. Leaf nodes 522, 524 are associated with literal values of the attribute associated with interior node 518 identified from constants used within a codebase. That is, leaf nodes 522, 524 are associated with second and third literal values 508, 510 of the surname attribute of the User class identified from code statements 504, 506 respectively.

In an embodiment, a static analysis unit, such as static analysis unit 324 of FIG. 3, is configured to generate a searchable representation, such as graphical representation 512 of FIG. 5A, of the values represented as constants within a codebase. As will be described in more detail below, the searchable representation can then be used to determine possible input values for inputs within a candidate test during the test generation process.

In an alternative embodiment, a static analysis unit, such as static analysis unit 324 of FIG. 3, is configured to generate a direct mapping between a variable or method call and a literal value or literal values assigned to the variable of method call. For example, a static analysis unit can parse code statement 502 and map first and second literal values 506, 508 to the User constructor, and parse code statement 504 and third map literal value 510 to the setSurname method of the User class. The direct mapping can then be queried to determine argument value(s) for a given method. For example, querying the direct mapping for the User constructor would return the list of all argument pairs (such as first and second literal values 506, 508) used to initialize User objects within a codebase.

Whilst the above is described in relation to method or function arguments, it is equally applicable to variable assignments. Constant values assigned to specific variables are extracted and recorded either within a searchable representation such as a graphical representation, or in a direct mapping. Literal values assigned to a variable name within a codebase can then be determined by querying the searchable representation or direct mapping according to the variable name or a derivation thereof.

FIG. 5B illustrates the process of performing static analysis to extract implementation types for interfaces, abstract classes, parent classes, and the like. FIG. 5B shows code statements 526, 528, 530 each associated with the instantiation of concrete representations 532, 534, 536 of an abstract class (i.e., the Account abstract class). Code statement 526 instantiates first concrete representation 532 corresponding to a CurrentAccount object which is a subclass of the Account abstract class. Code statement 528 instantiates second concrete representation 534 corresponding to an ISA object which is a subclass of the Account abstract class. Code statement 530 instantiates third concrete representation 536 corresponding to an OverdraftAccount object which is a subclass of the Account abstract class.

A static analysis unit, such as static analysis unit 324 of FIG. 3, can parse code statements within a codebase to extract and store different implementation types used for abstract classes, interfaces, parent classes, and the like. The implementation types extracted and stored can be subsequently used to generate possible implementation types for abstract classes, etc. within candidate tests. In the example shown in FIG. 5B, the implementation types extracted correspond to domain knowledge related to the Account abstract class.

For example, code statement 526 comprises first concrete representation 532 which corresponds to an implementation type (i.e., CurrentAccount) of the abstract class Account. A static analysis unit, such as static analysis unit 324, can parse code statement 526 to determine that first concrete representation 532 is used as an implementation type of abstract class Account.

The different concrete representation, or implementation types, can be represented graphically by graph 538 which links concrete representations to an abstract class, interface, parent class, and the like. Graph 538 comprises root node 540 and leaf nodes 542, 544, 546. Root node 540 is associated with the abstract class Account, and leaf nodes 542, 544, 546 are associated with the three different concrete representations, or implementation types, of the abstract class identified from code statements 526, 528, 530. For example, leaf node 542 is associated with first concrete representation 532, which is the CurrentAccount implementation type of the Account abstract class.

In an embodiment, a static analysis unit, such as static analysis unit 324 of FIG. 3, is configured to generate a searchable representation, such as graphical representation 538 of FIG. 5B, of the implementation types used within a codebase for interfaces, abstract classes, parent classes, and the like. As will be described in more detail below, the searchable representation can then be used to determine possible implementation types to be used as input values for inputs within a candidate test during the test generation process.

With reference once again to FIG. 3, the static analysis described above in relation to FIGS. 5A and 5B can be used by static analysis unit 324 to determine analysis data in the form of domain knowledge from first codebase 314. Static analysis unit 324 is configured to parse code statements within first codebase 314 in order to determine one or more candidate literal values and one or more candidate implementation types. As described above, the one or more candidate literal values and the one or more candidate implementation types are preferably stored within a queryable data structure, or mapping. The queryable data structure maps an input associated with a literal value to one or more candidate literal values, or an input associated with an implementation type to one or more candidate implementation types. In an alternative embodiment, the queryable data structure can further map an input associated with a method call to one or more candidate method calls.

For example, and with reference to the example candidate test shown in FIG. 4, the queryable data structure determined by performing static analysis of a first codebase can be queried to determine a possible literal value for input 418. Input 418 corresponds to the argument passed to method 408, which is the addToBalance method of the Account class. In this example, the first codebase comprises a plurality of code statements related to calling the addToBalance method of the Account class. As a result of a static analysis unit, such as static analysis unit 324 performing static analysis on the first codebase, the queryable data structure, when queried with the addToBalance method of the Account class, returns a list of literal values used as arguments to the addToBalance method. The list corresponds to all the literal values provided to the addToBalance method within the first codebase. As such, the literal values within the list represents a set of candidate input values for input 418 which can be used during generation of a candidate test.

As a further example, the queryable data structure determined by performing static analysis of a first codebase can be queried to determine a possible implementation type for input 414. Input 414 corresponds to a concrete representation to be used for abstract class Account. In this example, the first codebase comprises a plurality of code statements related to implementation types used to instantiate concrete representations of abstract class Account. As a result of a static analysis unit, such as static analysis unit 324, performing static analysis on the first codebase, the queryable data structure, when queried with the Account abstract class, returns a list of implementation types used to instantiate a concrete representation of the abstract class Account. The list corresponds to all the implementation types used for the Account abstract class within the first codebase. As such, the implementation types within the list represent a set of candidate implementation types for input 414 which can be used during generation of a candidate test.

Preferably, the queryable data structure or mapping determined by static analysis unit 324 from first codebase 314 is queryable by providing a pattern as input. Generally, when the pattern corresponds to a method name or variable name, the queryable data structure returns domain knowledge associated with possible literal values for that method or variable; when the pattern corresponds to an interface, abstract class, parent class, and the like, then the queryable data structure returns domain knowledge associated with possible implementation types for that interface, abstract class, parent class, and the like.

Preferably, the pattern provided as input corresponds to a fully qualified signature of the method, interface, or class. As is known, a fully qualified signature comprises the package (or namespace) information related to the method, interface, or class. A fully qualified interface or class signature includes the class or interface name along with the packages and subpackages (or namespaces) of the class or interface. A fully qualified method signature includes the method name, parameter types, class name, and the package and subpackages (or namespaces) of the class. For example, the fully qualified method signature for the User class may be com.diffblue.example.User(String forename, String surname). Querying the queryable data structure by the fully qualified name allows for disambiguation of identically named methods and implementation types appearing across different packages and namespaces. Furthermore, querying by the fully qualified name allows for approximate matching to be performed. When using approximate matching, the closest match within the queryable data structure can be returned if no exact match exists.

Whilst the above description relates to static analysis of first codebase 314 performed by static analysis unit 324 to determine analysis data associated with first codebase 314, static analysis unit 324 is further configured to perform a static analysis of second codebase 320 to determine analysis data associated with second codebase 320. Optionally, static analysis unit 324 is configured to perform a static analysis a plurality of codebases including second codebase 320 to determine analysis data associated with the plurality of codebases. Preferably, the plurality of codebases does not comprise first codebase 314 and testable component 312. Therefore, in order to differentiate from the static analysis performed on first codebase 314, the static analysis performed by static analysis unit 324 on a codebase other than first codebase 314 (e.g., static analysis of second codebase 320) is referred to as offline static analysis.

Offline static analysis determines domain knowledge from one or more other codebases to identify appropriate input values (i.e., candidate literal values and/or candidate implementation types) which may not be present within the codebase containing the testable component. This allows a richer set of candidate tests to be generated by utilizing a wider range of domain knowledge and analysis data which is still relevant to the context of testable component 312.

For example, consider a candidate test comprising an input associated with a concrete representation to be used for the abstract data type (i.e., interface) List. In this example, the only implementation type used for the List interface within the first codebase is the ArrayList implementing class. Considering the domain knowledge determined from a static analysis of first codebase alone, all candidate tests containing an input associated with the List interface would assign the ArrayList implementation type as the input value. However, by performing offline static analysis on one or more other codebases, other implementation types for the List interface used within the one or more other codebases (such as Vector, Stack, and the like) can be identified. These other implementation types can then potentially be used within candidate tests containing an input associated with the List interface. The present disclosure is not limited to generalizing from core library classes such as List; rather, domain knowledge can be used to generalize concepts such as User and Account to identify alternative classes for use during the dynamic fuzzing process.

Preferably, static analysis unit 324 is configured to perform offline static analysis periodically. More preferably, offline static analysis of second codebase 320 is not performed each time system 300 is used. Rather, offline static analysis of second codebase 320 is preferably performed when second codebase 320 is updated or a new codebase is added.

As such, in an embodiment static analysis unit 324 comprises offline mapping 326 corresponding to domain knowledge determined from analysis data associated with second codebase 320. Offline mapping 326 acts as a look-up-table between an input and a candidate value or implementation type determined from analysis data associated with second codebase 320. Static analysis unit 324 is configured to determine offline mapping 326 by performing an offline static analysis of second codebase 320. In a further embodiment, static analysis unit 324 is configured to determine offline mapping 326 by performing an offline static analysis of a plurality of codebases. Preferably, static analysis unit 324 is configured to append new domain knowledge determined from analysis data associated with a new codebase to offline mapping 326. In this way, the domain knowledge contained within offline mapping 326 can be periodically updated in order to incorporate analysis data associated with new codebases.

In one embodiment, offline mapping 326 is stored locally with the other parts of system 300. For example, when system 300 is implemented as a software development environment plugin or a command line tool, offline mapping 326 can be included as part of the software development environment plugin or command line tool. In an alternative embodiment, offline mapping 326 is stored remotely and accessed by static analysis unit 324 via a network. For example, offline mapping 326 can be stored in the cloud and accessed by static analysis unit 324 by means of an application programming interface (API). In this way, offline mapping 326 can be centrally updated without a corresponding update needing to be performed by system 300. In a further embodiment, offline mapping 326 can be stored locally but periodically updated by downloading an updated version of the mapping.

In an embodiment, static analysis unit 324 is configured to determine offline mapping 326 from second codebase 320 in the same manner as the queryable data structure, or mapping, is determined from first codebase 314. That is, static analysis unit 324 is configured to pass code statements within second codebase 320 to determine one or more candidate literal values and one or more candidate implementation types used within second codebase 320 (as described in more detail in relation to FIGS. 5A and 5B). Static analysis unit 324 is configured to determine offline mapping 326 using the one or more candidate literal values and the one or more candidate implementation types. Offline mapping 326 maps an input associated with a literal value to one or more candidate literal values identified from second codebase 320, and maps an input associated with an implementation type to one or more candidate implementation types identified from second codebase 320.

In summary, static analysis unit 324 is, in one embodiment, configured to perform a static analysis of first codebase 314 to determine analysis data associated with first codebase 314, and determine one or more candidate literal values and one or more candidate implementation types based on the analysis data associated with first codebase 314. Preferably, static analysis unit 324 is further configured to perform an offline static analysis of second codebase 320 to determine offline static analysis data associated with second codebase 320, and determine one or more candidate literal values and one or more candidate implementation types based on the analysis data associated with second codebase 320.

The domain knowledge, or analysis data, extracted from first codebase 314 and/or second codebase 320 (as described above) can be used to generate a harness and potential input values for a candidate test. In one embodiment, the domain knowledge can be used to identify inputs in a candidate test.

Beneficially, the use of domain knowledge leads to a harness, inputs, and potential input values which are context-aware. That is, the harness, inputs, and potential input values are not generated independently of the context within which they are used. Nor are the harness, inputs, and potential input values random. Rather, the harness, inputs, and potential input values have contextual meaning. Consequently, the context-aware harness, inputs, and potential input values generated from domain knowledge of first codebase 314 and/or second codebase 320 lead to the generation of tests which have the appearance of being written by the original software developer(s) of first codebase 314. That is, the generated tests utilize domain specific knowledge and can thus be seamlessly integrated into existing test suites associated with first codebase 314 without appearing, to the end user, as though they are automatically generated.

In one embodiment, static analysis unit 324 is configured to determine a harness for a candidate test based on domain knowledge, or analysis data, extracted from first codebase 314. The harness comprises code statements used to setup and invoke the testable component. Within the context of the Arrange-Act-Assert pattern, the harness comprises the arrange section and the act section. As such, the domain knowledge used to determine the harness can come from analysis data determined from first codebase 314 by static analysis unit 324.

In one embodiment, the harness is determined by identifying from first codebase 314 a set of code statements preceding an invocation of testable component 312 which are related to an object or variable utilized within the invocation. A control flow graph, or call graph, may be utilized to model the relationship between code statements within first codebase 314. The control flow graph, or call graph, can then be traversed in reverse order from the invocation of testable component 312 to determine the code statements used to setup the invocation (i.e., to determine the arrange section).

In an alternative embodiment, the harness is determined from one or more tests associated with testable component 312 within first codebase 314. That is, first codebase 314 may comprise a number of unit tests associated with testable component 312. The arrange and act sections of these unit tests can then be used to generate the harness. In a further embodiment, the harness may comprise a number of pre-defined code statements used to setup and invoke the testable component 312. For example, a manually written template test harness can be used as the harness.

In one embodiment, once the harness is determined, static analysis unit 324 is further configured to identify the inputs of the candidate test within the code statements of the harness. As stated previously, the inputs of the candidate test can refer to locations within the candidate test where either a literal value or an implementation type can be inserted. For example, input 410 in candidate test 400 of FIG. 4 refers to a location within code statement 402 in which a literal value, such as literal value 410-1, can be inserted.

Inputs associated with a literal value input value can be identified by parsing each code statements within the harness to identify constants appearing within the code statements. Examples of such constants include literal values assigned to variables, and literal values passed as arguments to methods or functions. Preferably, each constant appearing within a harness is identified as an input. Alternatively, a criterion can be applied such that only constants satisfying the criterion are identified as an input. For example, in an embodiment, the criterion can specify that only constants which are later used within the harness are identified as an input. Alternatively, in a different embodiment, the criterion can specify that only constants directly passed to the method under test are identified as an input.

Inputs associated with an implementation type input value can be identified by parsing each code statement within the harness to identify code statements related to the concrete instantiation of an abstract type such as an interface, an abstract class, and the like. The implementation type used to instantiate the concrete representation is then identified as an input. In an alternative embodiment, implementation types are identified by identifying code statements related to the assignment of a subclass to a superclass. The child class is then identified as an input.

Each input, (e.g., a literal value input, an implementation type input, and a method call input) is associated with contextual information in order to enable querying of static analysis data to identify candidate input values. For inputs corresponding to method or function arguments, the contextual information is preferably the fully qualified method or function signature including the parameter name(s) associated with the input. Alternatively, the contextual information is the method or function name and/or the parameter name(s) associated with the input. For inputs corresponding to a variable declaration, the contextual information is preferably the name of the variable to which value corresponding to the input is to be assigned. For inputs corresponding to an interface, abstract class, parent class, and the like, the contextual information is the fully or partly qualified signature of the interface, abstract, class, parent class, and the like, to which the implementation type is related.

Figure 6:
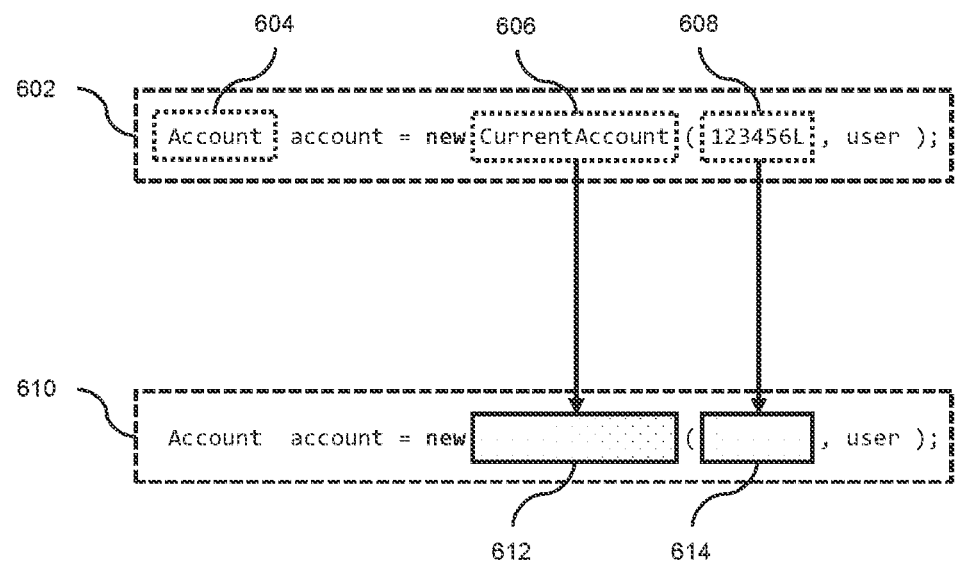
FIG. 6 illustrates the value and implementation type input parsing performed by a static analysis unit according to an embodiment.

FIG. 6 illustrates the literal value and implementation type input parsing performed by a static analysis unit according to one embodiment.

FIG. 6 shows code statement 602 comprising tokens 604, 606, 608. Code statement 602 forms a part of a harness determined by a static analysis unit, such as static analysis unit 324 of FIG. 3. Token 604 is associated with abstract class Account, token 606 is associated with a concrete implementation, CurrentAccount, of the abstract Account class, and token 608 is associated with a literal value related to an account number.

As such, in one embodiment, a static analysis unit, such as static analysis unit 324 of FIG. 3, is configured to parse code statement 602 to identify inputs to be used as part of a candidate test. Tokens 604, 606, 608 can be identified using any standard tokenization technique, by matching code statement 602 to one or more template code statements, or by employing a set of tokenization rules to identify the relevant tokens within code statement 602.

As described above, literal values can be identified from code statement 602 by identifying tokens within code statement 602 related to a constant or literal value. In the example shown in FIG. 6, token 608 relates to a literal value passed to the constructor of the ConcreteAccount class. As such, token 608 is flagged as a location within code statement 602 to be used as a literal value based input. In this example the second argument to the constructor of the ConcreteAccount class is not a literal value and so is not identified as an input.

As described above, implementation types can be identified from code statement 602 by determining whether code statement 602 is related to the concrete instantiation of an abstract type such as an interface, an abstract class, and the like. In the example shown in FIG. 6, code statement 602 relates to the instantiation of a concrete representation of the abstract class Account. As the type of the object being instantiated is an abstract class (as indicated by token 604), then code statement 602 is identified as being related to the concrete instantiation of an abstract type such as an interface, an abstract class, and the like. Therefore, token 606 (corresponding to the implementation type used in the concrete instantiation) is flagged as a location within code statement 602 to be used as an implementation type input.

Code statement 610 shows the code statement that would appear within the harness after parsing code statement 602 by a static analysis unit, such as static analysis unit 324 of FIG. 3. Code statement 610 comprises inputs 612, 614 identified from tokens 606, 608 within code statement 602 as described above.

In another embodiment, the inputs are not identified prior to the dynamic mutation-based fuzzing process. In this embodiment, a data structure representative of the test harness (including the assert section and act section), such as an abstract syntax tree (AST), is created. Inputs are dynamically identified from the data structure during the dynamic fuzzing process and a candidate test corresponds to the input values associated with the identified inputs.

Therefore, and referring once again to FIG. 3, static analysis unit 324 is, in one embodiment, configured to determine an initial, or template, candidate test by identifying the harness as described above. In one embodiment, the initial, or template, candidate test comprises one or more code statements and one or more associated inputs (as shown in the example candidate test of FIG. 4). The initial, or template, candidate test comprises a harness and one or more inputs.

A candidate test can be generated from the initial, or template, candidate test by assigning one or more values to the one or more inputs of the initial, or template, candidate test. Therefore, in one embodiment, a candidate test comprises an initial, or template, candidate test and one or more input values associated with the one or more inputs of the initial, or template, candidate test. In an alternative embodiment, a candidate test comprises one or more input values which can then be assigned to the corresponding one or more inputs of the initial, or template, candidate test.

According to the present disclosure, input values for a candidate test can be determined from dynamic analysis data (as described in more detail below) or domain knowledge.

As described above, static analysis unit 324 is, in one embodiment, configured to determine domain knowledge from static analysis data determined from first codebase 314 and/or offline static analysis data determined from second codebase 320. As the static analysis data and offline static analysis data do not change as a result of the dynamic mutation-based fuzzing approach described below, one or more candidate input values (i.e., candidate literal values and/or candidate implementation types) can be obtained from static analysis data prior to performing dynamic mutation-based fuzzing and stored in a data structure accessible during the dynamic mutation-based fuzzing approach.

In one embodiment, system 300 further comprises prioritized list of candidate input values 328. Prioritized list of candidate input values 328 includes at least one candidate input value based on domain knowledge associated with testable component 312. The at least one candidate input value can be determined as described above.

A candidate input value in the prioritized list of candidate input values 328 comprises either a candidate literal value or a candidate implementation type. Optionally, a candidate literal value can be associated with an implementation type. A candidate input value in the prioritized list of candidate input values 328 further comprises a priority value associated with the candidate literal value of the candidate implementation type.

A priority value associated with a candidate input value is indicative of its relative importance and, thus, the importance of whether the candidate input value should be included in a test. Generally, and preferably, the priority value assigned to a candidate input value is representative of whether or not a software developer, or programmer, would choose the candidate input value. A higher priority value indicates that a software developer, or programmer, would be more likely to use the candidate input value within a test.

In an embodiment, the priority value is determined based on one or more predetermined criteria relating to the source of the associated candidate input value. A predetermined criterion has a corresponding factor value, which is an integer valued number, or real valued number, that is added to a priority value associated with a candidate input value if the candidate input satisfies the predetermined criteria. As such, the priority value assigned to a candidate value is the sum of the factor values associated with the predetermined criteria which the candidate value meets.

A first category of predetermined criteria having a first range of corresponding factor values are met if the candidate input value is generated during execution. As described in more detail below, during dynamic mutation-based fuzzing, a candidate input value can be generated based on literal values encountered during execution or exceptions thrown during execution. Preferably, a high factor value within the first range of corresponding factor values is associated with criteria related to whether or not certain exceptions are thrown during execution. For example, a criteria associated with whether the candidate input value was generated as a result of a NullPointerException will have the highest priority value within the first range of corresponding factor values because, in a manual software development environment, the software developer would have to take an action to set the respective object to not-null. In this instance the action is represented by the candidate input value.

A second category of predetermined criteria having a second range of corresponding factor values are met if the candidate input value is commonly encountered within the static analysis data extracted from first codebase 314. Preferably, a predetermined criterion within the second category assigns a high factor value within the second range of corresponding factor values if a candidate input value is commonly encountered within first codebase 314. Alternatively, a predetermined criterion within the second category assigns a high factor value within the second range of factor values if a candidate input value is not commonly encountered within first codebase 314.

A third category of predetermined criteria having a third range of corresponding factor values are met if the candidate input value is commonly encountered within the offline static analysis data extracted from second codebase 320. In one embodiment, a predetermined criterion within the third category assigns a high factor value within the third range of corresponding factor values if a candidate input value is commonly encountered within second codebase 320. In an alternative embodiment, a predetermined criterion within the third category assigns a high factor value within the third range of factor values if a candidate input value is not commonly encountered within second codebase 320.

A fourth category of predetermined criteria having a fourth range of corresponding factor values are met if the candidate input value is commonly encountered within the dynamic analysis data generated during execution (as described in more detail below). In one embodiment, a predetermined criterion within the fourth category assigns a high factor value within the fourth range of corresponding factor values if a candidate input value is used within a conditional expression during execution. In an alternative embodiment, a predetermined criterion within the fourth category assigns a high factor value within the fourth range of factor values if a candidate input value has not been previously encountered during the current execution.

Preferably the first range of corresponding factor values, the second range of corresponding factor values, the third range of corresponding factor values, and the fourth range of corresponding factor values are distinct non-overlapping ranges. The numerical limits of each range of corresponding factor values is adjustable in order to allow different executions of system 300 to be configured to identify different types of candidate input value depending on a user's requirements.

One preferable configuration is to assign the first category the highest range of corresponding factor values, the fourth category the next highest range of corresponding factor values, the second category the next highest range of corresponding factor values, and the third category the lowest range of corresponding factor values. In this configuration, candidate input values generated during execution are assigned the highest priority and thus are more likely to be included in generated tests and are more likely to drive the exploration of further candidate input values (as described in more detail below). Example numerical limits for this preferable configuration would be [16, 20] for the highest range of corresponding factor values, [11, 15] for the next highest range of corresponding factor values, [6, 10] for the next highest range of corresponding factor values, and [1, 5] for the lowest range of factor values.

An alternative configuration is to assign higher ranges of factor values to categories relating to the static analysis data. In this way, commonly occurring values within first codebase 314 and/or second codebase 320 candidate input values are more likely to be included in generated tests and are more likely to drive the exploration of further candidate input values (as described in more detail below). Thus, the resulting tests use real data extracted from existing codebases and thus are more likely to have the appearance of tests generated by a human software developer Therefore, the specific configuration of factor values assigned to different criteria allows adjustment to the relative importance of static data and dynamic data to the test generation process and the tests generated thereby.

The skilled person will appreciate that the numerical ranges and orderings described above are in no way intended to be limiting. The exact numerical limits and ordering of ranges is fully customizable and thus give rise to a robust and highly configurable system for automatic test generation.

In an embodiment, a candidate input value is assigned a priority value (as described above) prior to being added to prioritized list of candidate input values 328. Prioritized list of candidate input values 328 maintains an ordered representation of candidate input values such that candidate input values can be added and accessed according to their corresponding priority values. In one embodiment, prioritized list of candidate input values 328 is a queue based data structure.

Preferably, static analysis unit 324 is configured to populate prioritized list of candidate input values 328 with all candidate input values relevant to the inputs of the initial candidate test. That is, each input within the initial candidate test is used to query the static analysis data mapping. The resulting candidate input values are assigned priority values (as described above) and added to prioritized list of candidate input values 328. Alternatively, static analysis unit 324 is configured to add a candidate input value to prioritized list of candidate input values 328 only if the corresponding priority value of the candidate input value exceeds a predetermined threshold.

In one embodiment, update unit 302 is configured to obtain prioritized list of candidate input values 328. Initially, prioritized list of candidate input values 328 only contains candidate input values relevant to the initial candidate test determined from domain knowledge (i.e., determined from static analysis and/or offline static analysis). Prioritized list of candidate input values 328 is iteratively updated by update unit 302 in order to identify new candidate input values from dynamic analysis data. Update unit 302 is configured to perform a dynamic mutation-based fuzzing to update prioritized list of candidate input values 328 and create candidate tests based on the dynamic prioritization of candidate input values.

Figure 7:
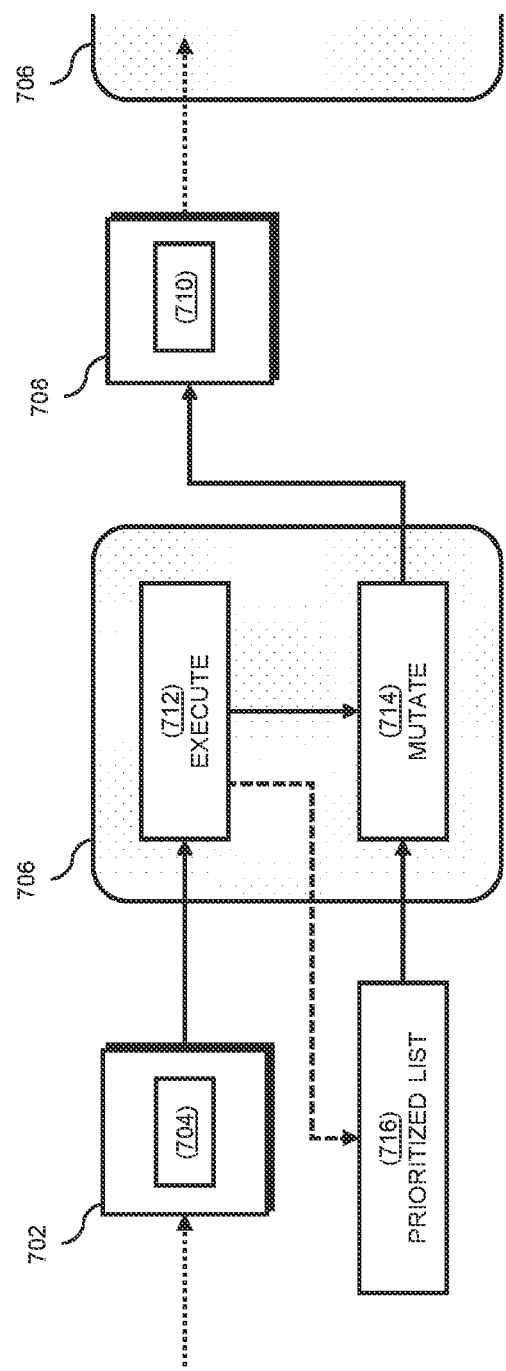
FIG. 7 illustrates a dynamic mutation-based fuzzing approach according to an aspect of the present disclosure.

FIG. 7 illustrates a dynamic mutation-based fuzzing approach according to an aspect of the present disclosure.

FIG. 7 shows first candidate test 702 comprising first input value 704. First input value 704 is associated with a first input (not shown) of first candidate test 702. First candidate test 702 is input to dynamic mutation-based fuzzing process 706 to obtain second candidate test 708 comprising second input value 710. Second input value 710 is associated with the first input of second candidate test 708.

Dynamic mutation-based fuzzing process 706 comprises execution step 712 and mutation step 714. Execution step 712 executes first candidate test 702 and collects data (not shown) related to the execution. As will be described in more detail below, the data collected during execution step 712 can correspond to exceptions thrown during execution or values computed as a result of execution. Candidate input values determined from the collected execution data are added to prioritized list of candidate input values 716 according to determined priority values. If no data is generated or collected during execution, or if the determined priority values do not exceed a predetermined threshold, then no candidate values are added to prioritized list of candidate input values 716.

At mutation step 714, first candidate test 702 is mutated by selecting a candidate input value from prioritized list of candidate input values 716. Preferably, the candidate input value is selected by obtaining the candidate input value associated with the first input (not shown) from prioritized list of candidate input values 716 having the highest priority. This candidate input value can be thought to represent the most relevant, most interesting, or most important, input value to be used for the first input (not shown) within a subsequent candidate test. The candidate input value is then used to replace first input value 704 associated with the first input (not shown) of first candidate test 702. Prioritized list of candidate input values 716 comprises candidate values determined as a result of execution and values determined from domain knowledge. As such, mutation of first input value 704 is based on dynamic data, static data, or offline static data.

Mutation of first candidate test 702 results in the creation of second candidate test 708 comprising second input value 710. Here, second input value 710 corresponds to the candidate input value selected from prioritized list of candidate input values 716. As will be described in more detail below, a test can be generated from first candidate test 702 or second candidate test 708.

Dynamic mutation-based fuzzing process 706 can then be repeated on second candidate test 708 in order to discover further candidate tests and further candidate input values.

Therefore, the above described dynamic prioritization and discovery of candidate input values provides an efficient way of exploring the space of all possible candidate tests by performing a lazy traversal of the space of all possible candidate tests. Furthermore, by prioritizing candidate input values which are more similar to input values used by a human software developer, more natural and useful tests are generated.

Referring once again to FIG. 3, update unit 302 is configured to generate second candidate test 316 comprising second input value 318 for first input 308 based on a dynamic mutation-based fuzzing of first candidate test 306 comprising first input value 310 for first input 308. The dynamic mutation-based fuzzing of first candidate test 306 to create second candidate test 316 is described in detail below.

As illustrated in FIG. 7, dynamic mutation-based fuzzing is an iterative discovery process. At the start of an iteration of the dynamic mutation-based fuzzing process, update unit 302 is configured to obtain first candidate test 306 associated with testable component 312. In an embodiment, for the first iteration of the dynamic mutation-based fuzzing process, update unit 302 is configured to obtain first candidate test 306 from static analysis unit 324. That is, update unit 302 is configured to obtain the initial, or template, candidate test from static analysis unit 324. First candidate test 306 is determined from the initial, or template, candidate test by selecting input values from prioritized list of candidate input values 328 having the highest priority (as described in detail in relation to FIGS. 10A-F below). For subsequent iterations of the dynamic mutation-based fuzzing process, update unit 302 is configured to obtain first candidate test 306 from the previous iteration of the dynamic mutation-based fuzzing process. That is, the first candidate test can correspond to the second candidate test determined in the previous iteration of the dynamic mutation-based fuzzing process.

Update unit 302 is further configured to cause an execution of first candidate test 306 and record data generated during the execution of first candidate test 306. This dynamic data can be used to determine candidate input values for inclusion in a future candidate test.

In an embodiment, system 300 further comprises execution unit 330 configured to execute first candidate test 306. As first candidate test 306 may not contain sufficient code to be executed independently (e.g., the first candidate test contains only an arrange and an act section), then execution unit 330 is preferably configured to execute first candidate test 306 within a suitable test harness and environment. Preferably, the suitable test harness comprises predetermined code within which first candidate test 306 can be placed for execution. Alternatively, the suitable test harness is dynamically determined based on the code within first candidate test 306 such that dependencies and referenced packages or classes are correctly imported.

Preferably, execution unit 330 is configured to execute first candidate test 306 within a sandboxed environment in order to avoid any technical or security issues arising from the execution of first candidate test 306. As first candidate test 306 has been automatically generated, it is advantageous to constrain the operations performed whilst ensuring that first candidate test 306 executes normally. Any suitable known method for sandboxing can be used. For example, for Java based applications, first candidate test 306 can be sandboxed using a security manager with the code for first candidate test 306 being loaded by a class loader or the like.

In order to capture and record data generated during execution of first candidate test 306, execution unit 330 is preferably configured to execute an instrumented version of first candidate test 306.

Figure 8A:
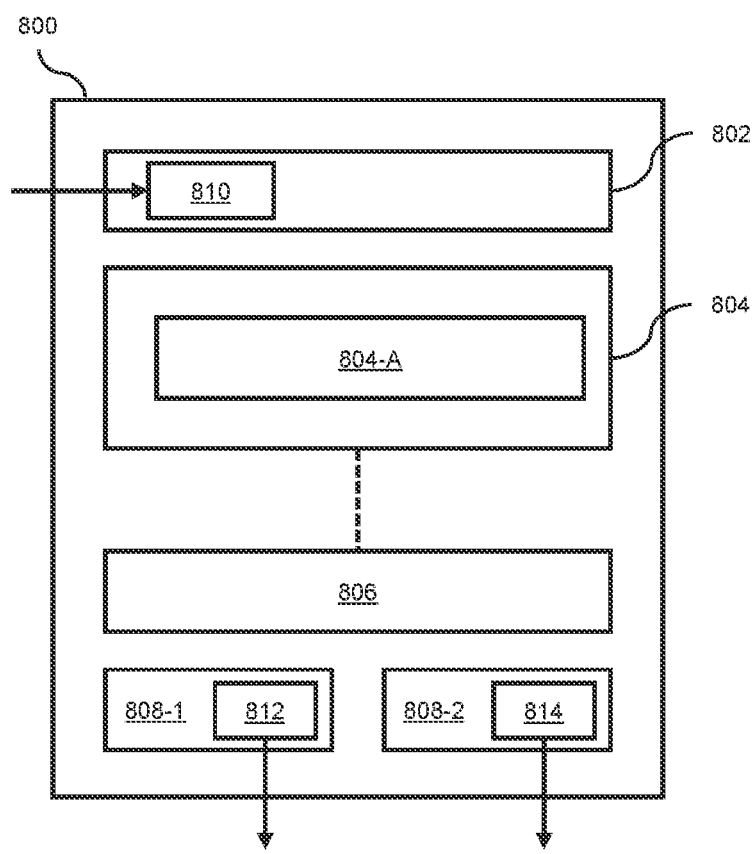
FIGS. 8A and 8B illustrate the general concept of instrumentation and the data captured via instrumentation according to an embodiment.
Figure 8B:
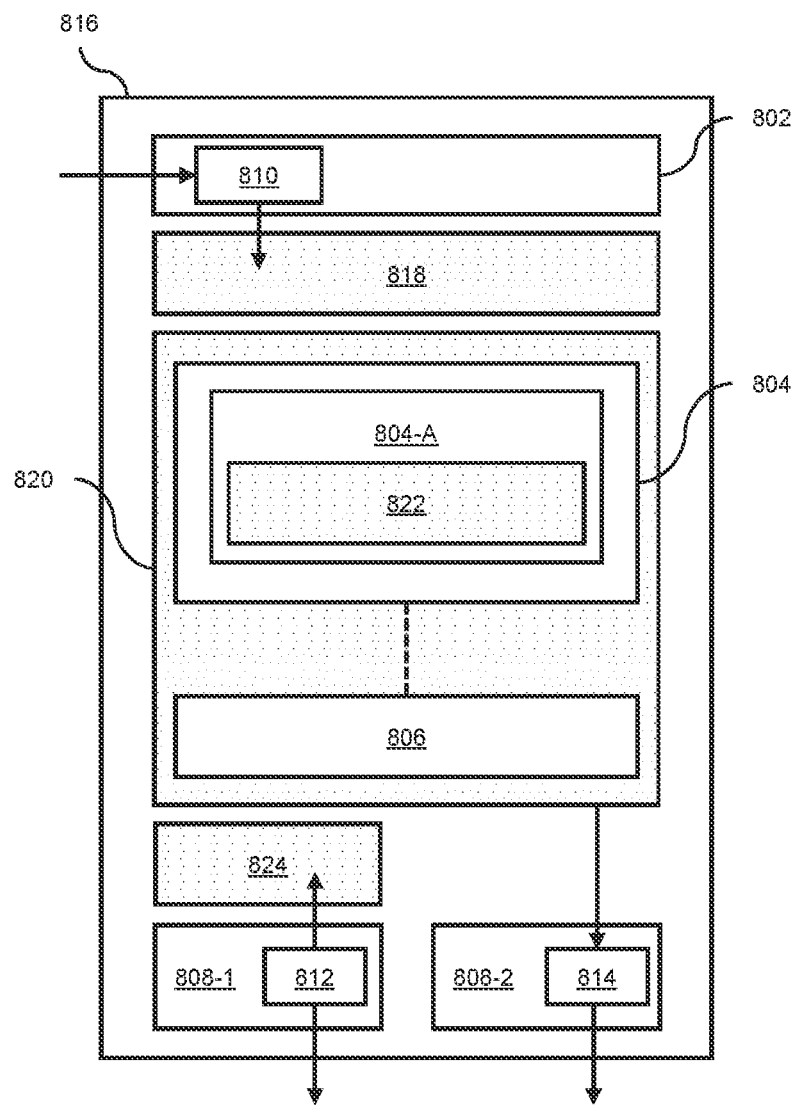

In one embodiment, system 300 further comprises instrumentation unit 332 configured to instrument first candidate test 306 thereby to produce an instrumented first candidate test. Instrumentation unit 322 is further configured to instrument all source code and dependencies relevant to execution of first candidate test 306. For ease of reference, the instrumentation process is described in relation to first candidate test 306 only. However, the skilled person will appreciate that the instrumentation process is applicable to any item of source code relevant to execution of first candidate test 306 (e.g., all methods called during the execution of the first candidate test). Instrumentation of first candidate test 306 includes instrumentation of testable component 312. Execution unit 330 preferably executes the instrumented first candidate test which involves execution of the instrumented testable component. FIGS. 8A and 8B illustrate the general concept of instrumentation and the data captured via instrumentation.

FIG. 8A shows an illustrative representation of a code section prior to instrumentation according to an embodiment.

FIG. 8A shows code section 800 of a software program prior to instrumentation. Code section 800 is associated with a single section of code. Preferably, code section 800 is associated with a testable component, method, or procedure. Code section 800 comprises entry point 802, code blocks 804, 806, and exit points 808-1, 808-2. Entry point 802 may be considered the same as the declaration or signature of a method, code blocks 804, 806 may be considered the same as the body of the method, exit point 808-1 may be considered a return statement of the method when the method executes successfully, and exit point 808-2 may be considered an exit point of the method when an exception arises.

Entry point 802 may require parameter 810 which takes a parameter value (not shown) during execution. After execution of entry point 802, code block 804 is executed which comprises code sub-block 804-A. For example, code block 804 can comprise a block of code associated with a conditional statement and so code sub-block 804-A can comprise a block of code which is executed when the conditional statement evaluates to "True". As such, whilst the conditional statement of code block 804 is evaluated every time the code section is executed, code sub-block 804-A is only conditionally executed. After code block 804 is executed, code block 806 is executed before exit point 808-1 is reached. Exit point 808-1 requires return type 812 which takes a return value (not shown) during execution. That is, when code blocks 804, 806 execute without raising an error or exception, then exit point 808-1 is executed returning a value for return type 812. Conversely, if an exception is thrown as a result of execution of code blocks 804, 806 then exit point 808-2 is executed. Exit point 808-2 requires exception type 814 which takes an exception value (not shown) during execution. That is, if an exception is thrown as a result of execution of code block 804 or 806, then exit point 808-2 is executed raising an exception value for exception type 814 associated with the thrown exception.

FIG. 8B shows instrumented code section 816, which is an instrumented version of code section 800 shown in FIG. 8A produced by an instrumentation unit, such as instrumentation unit 332 shown in FIG. 3 and described in the associated description.

Instrumented code section 816 comprises entry point 802, code blocks 804, 806, code sub-block 804-A and exit points 808-1, 808-2 corresponding to those shown in code section 800 of FIG. 8A. Instrumented code section 816 further comprises instrumented code blocks 818, 820, 822, 824 inserted by an instrumentation unit, such as instrumentation unit 332 shown in FIG. 3.

Instrumented code block 818 is configured to collect instrumentation data related to execution of entry point 802. Preferably, instrumented code block 818 comprises a program statement which records, to a data structure, instrumentation data indicating that entry point 802 of the associated method has been reached. In an embodiment, the data structure is a part of an execution unit, such as execution unit 330 of FIG. 3. In an alternative embodiment, the data structure is separate from the execution unit, but accessible by an update unit, such as update unit 302 of FIG. 3. Optionally, the data structure is a persistent data structure. The instrumentation data indicating that entry point 802 has been reached includes a reference to the method and optionally a unique identifier assigned to the current invocation of the method. The program statement of instrumented code block 818 records the reference and optionally the unique identifier to the data structure. The program statement further records to the data structure a parameter value passed to parameter 810 of entry point 802. If the method associated with the entry point takes more than one parameter, then each parameter value is recorded by the program statement of instrumented code block 818. Optionally, instrumented code block 818 records other instrumentation data to the data structure such as the system time at execution and information regarding the state of the program or device at the time of execution.

Instrumented code block 820 is configured to collect instrumentation data regarding any exceptions or errors occurring as a result of execution of code blocks 804, 806. Preferably, instrumented code block 820 comprises a program statement which records, to the data structure, instrumentation data regarding any exceptions or errors occurring as a result of execution of code blocks 804, 806. During execution of code blocks 804, 806, normal execution may be interrupted as a result of an error or exception occurring.

Examples of such errors or exceptions include but are not limited to array index out of bounds exceptions, null pointer exceptions, and security exceptions. In order to capture any instrumentation data related to the flow of execution resulting from an execution being thrown, instrumented code block 820 preferably wraps code blocks 804, 806 within a single code block.

Instrumented code block 822 is configured to collect instrumentation data regarding code block 804-A. Preferably, instrumented code block 822 comprises a program code statement which records, to the data structure, instrumentation data identifying that code sub-block 804-A has been executed. For example, the data may identify that instrumented code block 822 has been executed by setting a flag or recording a binary value. Therefore, this instrumentation data preferably indicates that coverage has been achieved.

Instrumented code block 824 is configured to collect instrumentation data regarding exit point 808-1. Preferably, instrumented code block 824 comprises a program statement which records, to the data structure, instrumentation data indicating that exit point 808-1 has been reached. More preferably, instrumented code block 824 further records to the data structure the return value for return type 812.

As such, instrumented code blocks 818, 820, 822, 824 are configured to collect instrumentation data related to the execution of code section 800 and store the collected instrumentation data to a data structure.

Referring once again to FIG. 3, instrumentation unit 332 is, in one embodiment, configured to instrument testable component 312 using the instrumentation methodology described in relation to FIGS. 8A and 8B thereby to produce instrumented testable component. Instrumentation unit 332 is further configured to instrument each code statement within the arrange section of first candidate test 306 thereby to produce instrumented first candidate test. Preferably instrumenting each code statement within arrange section of first candidate test 306 comprises inserting instrumentation code to collect data relating to exceptions thrown by the code statement, and data relating to any values determined as a result of execution of the code statement (as described below). Optionally, only code statements within first candidate test 306 which comprise an input, such as the code statement associated with input 308, are instrumented.

Execution of instrumented first candidate test by execution unit 330 comprises execution of instrumented testable component. During execution of instrumented first candidate test and instrumented testable component, data is collected and stored in a data structure by execution unit 330.

Preferably, the data collected from the instrumented testable component includes: (i) any exceptions raised as a result of execution of the code statement; (ii) coverage information; (iii) the value or values passed to the instrumented testable component; (iv) optional context information relating to which input of the testable component the data relates to.

The data generated during execution is stored in a data structure accessible by update unit 302. After execution has been performed, the generated data is used to determine potential candidate input values which can be added to prioritized list of candidate input values 328. Therefore, each input, such as input 308, of first candidate test 306 is associated with data generated during execution. The link between an input and data generated during execution is illustrated in FIG. 9.

FIG. 9 shows a snippet of an example instrumented candidate test.

FIG. 9 shows code statement 902 comprising first input 904 and second input 906. As such, code statement 902 relates to a code statement within the arrange section of a candidate test. In order capture data relevant to first input 904 and second input 906, the instrumented candidate test comprises instrumented code statements 908-1, 908-2, 910, 912.

Instrumented code statements 908-1, 908-2 catch any exceptions which occur as a result of execution of code statement 902. As shown in instrumented code statement 912, the thrown exception is recorded in the data structure before being re-thrown. As will be described in more detail below, the thrown exception may relate to either first input 904 or second input 906. As such, the data structure records the exception as being potentially relevant to first input 904 and second input 906.

Instrumented code statement 910 records to the data structure the call made within code statement 902. Instrumented code statement 910 is automatically inserted prior to code statement 902 in order to record the call even in the event of execution being interrupted as a result of executing code statement 902. Instrumented code statement 910 records a unique identifier assigned to code statement 902. In one embodiment, the unique identifier allows the data generated during execution of code statement 902, and recorded by instrumented code statements 910 and 912, to be associated with first input 904 and second input 906. In this embodiment, an update unit, such as update unit 302 of FIG. 3, maintains a mapping between unique identifiers and inputs appearing within a candidate test so that data generated during execution can be linked to specific inputs. Instrumented code statement 910 further records data specific to code statement 902: (i) the class associated with first input 904 used for the instantiation, and (ii) the value of the argument associated with second input 906 passed to the class constructor. Therefore, an instrumented code statement is preferably configured to capture data relevant to the inputs within the associated code statement. This allows the collected data from an instrumented code statement comprising a plurality of inputs to be associated with the relevant input(s).

For example, if the code statement being instrumented relates to the instantiation of a concrete type of an abstract class or interface, then the instrumented code captures data related to the class of the concrete implementation type, and the literal value(s) of any constructor argument(s) appearing as literal constants. The data related to the class of the concrete implementation type is automatically associated with first input 904, and the data related to the literal value(s) of any constructor argument(s) is automatically associated with second input 906.

Thus, the data generated during execution is related to one or more inputs appearing within the candidate test being executed. This data can then be used to determine possible candidate input values for the inputs which can be used in future candidate tests. For example, and with reference once again to FIG. 3, the data related to input 308 generated during execution of first candidate test 306 can be used to determine a candidate input value which can be used as an input value for input 308 in a future candidate test, such as input value 318 for input 308 of second candidate test 316.

Update unit 302 is configured to determine a candidate input value based on the data generated during the execution of first candidate test 306. Optionally, update unit 302 is configured to determine a plurality of candidate input values based on the data generated during the execution of first candidate test 306. Preferably, the data generated during execution can be used to determine a candidate input value for any input. Alternatively, the data generated during execution from which the candidate input value is determined is associated with an input, such as input 308, of first candidate test 306.

As stated above, the data generated during execution of first candidate test 306 can generally relate to literal value data or exception data, and is associated with an input, such as input 308, of first candidate test 306. As such, update unit 302 is preferably configured to determine, for each input in first candidate test 306, a candidate input value based on the data generated during execution.

For an input corresponding to a literal value, both the literal value data and the exception data generated during execution can be used to determine a candidate input value for the input. The literal value data generated during execution is referred to herein as the observed literal value, and the exception data generated during execution is referred to herein as the observed exception.

For literal value data generated during execution, the observed value can be used to determine a new candidate input value for inputs associated with literal values. For example, if the input value corresponds to a numerical value such as an integer, double, or the like, then the observed value can be incremented or decremented by a predetermined amount to determine a new candidate input value. Alternatively, the observed value can be otherwise manipulated or transformed by applying a number of predetermined mathematical operations. The implementation type of the input can also be cast to a different type. For example, if the observed value was of type long, then the new candidate input value can be the same value as the observed value but cast to another implementation type such as int, double, and the like.

For exception data generated during execution, the observed exception can be used to determine a new setter call to set a field to a non-null value. Alternatively, the observed exception can be used to determine a new candidate input value for inputs associated with literal values and inputs associated with implementation types.

For inputs associated with literal values, a set of heuristics are preferably used by update unit 302 to determine a change to be made as a result of the specific exception thrown. A heuristic defines a rule to be applied as a result of the exception. Each heuristic is specific to a particular type of exception and represents a mechanism to identify a new candidate input value (i.e., literal value) for the input as a result of the data contained in the exception.

The following list of example exception heuristics, or rules, are specific to the Java programming language for illustrative purposes and ease of understanding. The skilled person will appreciate that the use of Java is not intended to be limiting, and the principles outlined below are readily applicable to other programming languages such as C++ and Python. The skilled person will further appreciate that the follow list of exceptions is not exhaustive and is intended to be illustrative of the functionality performed in relation to the determination of candidate input values from exception data generated during execution and that further exceptions may be used.

An arithmetic exception heuristic is applied when an arithmetic exception is thrown. An arithmetic exception is thrown when an exceptional arithmetic condition, such as a divide by zero, has occurred. Therefore, a rule applied by an arithmetic exception heuristic is to create a new candidate input value which increments, or decrements, input value 308.

A class cast exception heuristic is applied when a class cast exception is thrown. A class cast exception is thrown when an attempt has been made to cast an object to a subclass of which it is not an instance. Therefore, a rule applied by a class cast exception heuristic is to identify a new candidate input value corresponding to an implementation type that is compatible with the class cast exception from prioritized list of candidate input values 328. The chosen implementation type determines the availability of constructors to use for instantiating the object.

A number format exception heuristic is applied when a number format exception is thrown. A number format exception is thrown when an attempt is made to case a String to a numeric type but the String does not have the appropriate format. A number format exception is often thrown when a String comprising numbers contains extraneous characters. Therefore, a rule applied by a number format exception heuristic is to create new candidate input value which corresponds to input value 308 with any extraneous characters removed (e.g., by calling the String instance methods trim( ), replaceAll( ), etc.).

An index out of bounds exception heuristic is applied when an index out of bounds exception is thrown. An index out of bounds exception is thrown when an index is out of range. Therefore, a rule applied by an array index out of bounds exception heuristic is to create a new candidate input value which increments, or decrements, input value 308.

A null pointer exception heuristic is applied when a null pointer exception is thrown. A null point exception is thrown when an attempt is made to use a null when an object is required. For example, if the input value corresponds to an object having a field which is null, then a call to that field will result in a null pointer exception being thrown. Therefore, a rule applied by a null point exception heuristic is to create a new candidate input value which corresponds to input value 308 with the setter of the null field being called.

A negative array size exception heuristic is applied when a negative array size exception is thrown. A negative array size exception is thrown when an attempt is made to create an array with a negative size. Therefore, a rule applied by a negative array size exception is to create a new candidate input value which is positive, e.g., a positive representation of input value 308.

In summary, when exception data related to an input associated with a literal value is generated during execution, the rule of heuristic for the relevant exception is applied to determine a new candidate input value. As described below, the new candidate input value is optionally added to prioritized list of candidate input values 328.

For an input corresponding to an implementation type, the exception data generated during execution can be used to determine a new candidate input value (i.e., implementation type) for the input. Preferably, the new candidate input value comprises a different implementation type to that specified by input value 308. In an embodiment, a predefined list of preferred implementation types is maintained for each interface, abstract class, parent class, and the like. The new candidate input value is then identified by selecting a previously unselected implementation type from the predefined list. As described below, the new candidate input value is optionally added to prioritized list of candidate input values 328.

In one embodiment, the exception data generated during execution can result in one or more new inputs being created within a candidate test. That is, the exception data generated during execution can be used to generate a new code statement to be included within a candidate test. The new code statement can comprise one or more inputs having a corresponding one or more input values. As an example, if a NullPointerException is thrown during execution indicating that a field of an object is null, then a heuristic can be applied to modify the candidate test to include a call to the setter method of the field. The information related the exception is utilized to determine the object and associated setter method. The call is added to the candidate test prior to the call from which the exception was raised. Once the call is added to the candidate test, the value(s) passed to the setter method can be identified and explored during dynamic mutation-based fuzzing.

As is clear from the above, a single execution of first candidate test 306 can result in a plurality of candidate input values being created based on the data generated during the execution. In order to filter the candidate input values, and ensure that those which are most promising are used in future candidate tests, each candidate input value created is assigned a priority value.

In an embodiment, update unit 302 is configured to determine a priority value for a candidate input value, where the candidate input value is determined based on the data generated during execution of first candidate test 306 and/or the domain knowledge associated with testable component 312 (as described in detail above).

Update unit 302 is further configured to add the candidate input value to prioritized list of candidate input values 328 according to the priority value associated with the candidate input value. In an embodiment, update unit 302 is configured to add the candidate input value to prioritized list of candidate input values 328 only if the priority value associated with the candidate input value exceeds a predetermined threshold. As the priority value is indicative of the relative importance of the candidate input value, and the relative importance, or level of interest, of the candidate input value, a predetermined threshold can be used to filter out candidate input values which are unlikely to lead to further candidate tests.

As such, and as described in more detail below, if the candidate input value has the highest priority within prioritized list of candidate input values 328 for input 308, then the candidate input value will most likely be used as the next input value for input 308 when first candidate test 306 is modified to create second candidate test 316.

Update unit 302 is further configured to modify first candidate test 306 to create second candidate test 316 based on first candidate test 306. Second candidate test 316 includes modified input value 318 for input 308 which is different to corresponding input value 310 for input 308 of first candidate test 306. Update unit 302 is configured to select modified input value 318 from prioritized list of candidate input values 328. Preferably, and as described in more detail in relation to FIG. 10, updated unit 302 is configured to select modified input value 318 from prioritized list of candidate input values 328 by selecting the candidate input value for input 308 that has the highest priority.

FIGS. 10A-F illustrate the input value modification process performed by update unit 302 when creating a candidate test from a previous candidate test. As such, FIGS. 10A-F in general illustrate the dynamic mutation-based fuzzing process performed by the present disclosure.

Figure 10A:
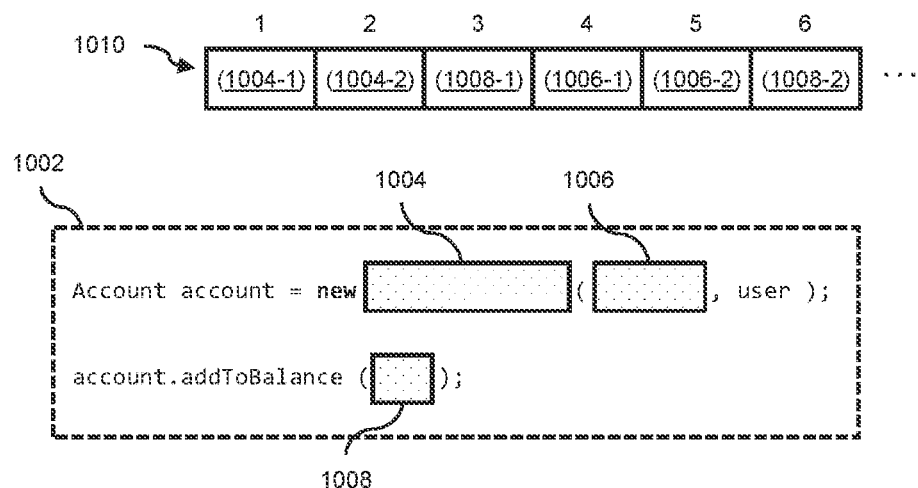
FIGS. 10A-F illustrate the input value modification process according to an aspect of the present invention.

FIG. 10A shows template candidate test 1002 comprising first input 1004, second input 1006, and third input 1008. FIG. 10A further shows prioritized list of candidate input values 1010 comprising first candidate input values 1004-1, 1004-2, second candidate input values 1006-1, 1006-2, and third candidate input values 1008-1, 1008-2. First candidate input values 1004-1, 1004-2 are associated with first input 1004. Second candidate input values 1006-1, 1006-2 are associated with second input 1006. Third candidate input values 1008-1, 1008-2 are associated with third input 1008. Here, a candidate input value being associated with a specific input means that the input value is suitable for use with the input. The candidate input values within prioritized list of candidate input values 1010 are ordered by priority such that first candidate input value 1004-1 has a greater priority value than the priority value of first candidate input value 1004-2. This is represented within prioritized list of candidate values 1010 by first candidate input value 1004-1 being in position 1 and first candidate input value 1004-2 being in position 2.

Figure 10B:
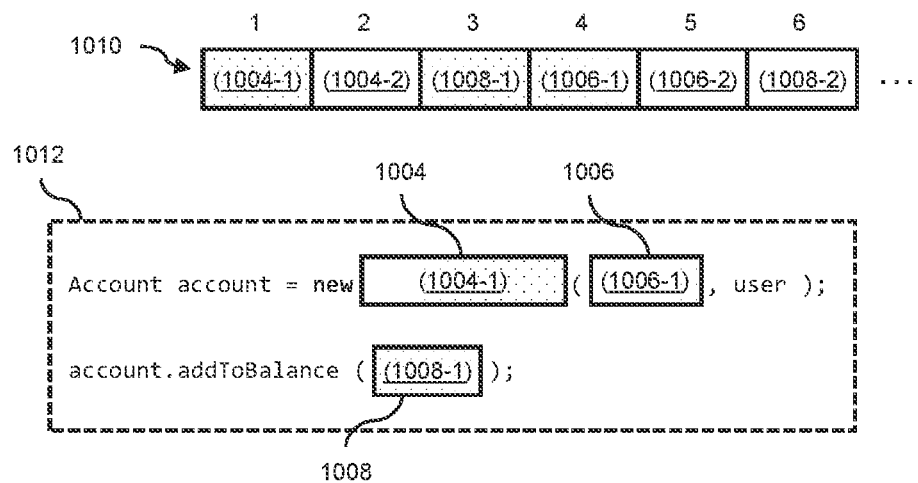

FIG. 10B shows first candidate test 1012 created from template candidate test 1012 shown in FIG. 10A. As described above, template candidate test 1002 is created by a static analysis unit such as static analysis unit 324 of FIG. 3. First candidate test 1012 is created by selecting the combination of candidate input values for first input 1004, second input 1006, and third input 1008 having the highest total priority. In the example shown in FIGS. 10A-E, priority is the inverse of positional value within prioritized list of candidate input values 1010. Therefore, selecting the combination of candidate input values having the highest total priority is equivalent to selecting the combination of candidate input values having the lowest total positional value.

In the example shown in FIG. 10B, an update unit, such as update unit 302 of FIG. 3, selects the combination comprising first candidate input value 1004-1 at position 1 in prioritized list of candidate input values 1010, second candidate input value 1006-1 at position 4 of prioritized list of candidate input values 1010, and third candidate input value 1008-1 at position 3 of prioritized list of candidate input values 1010. The total combination of positions (i.e., the positional sum) for this combination is therefore 8, which, as stated above, corresponds to the combination of candidate input values with the highest priority.

The selected candidate input values are assigned to the relevant inputs within first candidate test 1012 such that first input 1004 is assigned first candidate input value 1004-1, second input 1006 is assigned second candidate input value 1006-1, and third input 1008 is assigned third candidate input value 1008-1.

First candidate test 1012 corresponds to the first candidate test selected by an update unit, such as update unit 302 of FIG. 3, during the dynamic mutation-based fuzzing process. As such, first candidate test 1012 is executed and data relating to the execution is recorded. Based on the recorded data, one or more candidate input values are determined. However, in the example shown in FIG. 10B, none of the candidate input values are determined to have a sufficiently high priority to be added to prioritized list 1010.

Figure 10C:
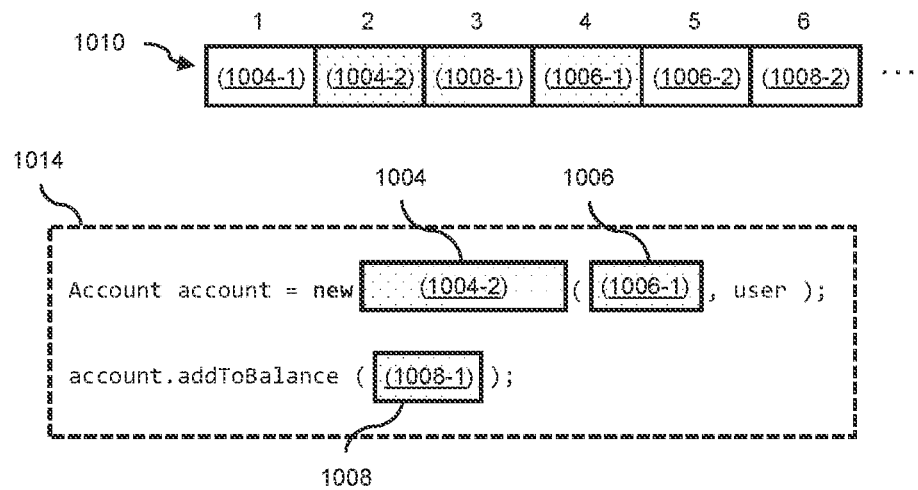

First candidate test 1012 is then modified to create second candidate test 1014 shown in FIG. 10C.

FIG. 10C shows second candidate test 1014 created from first candidate test 1012 shown in FIG. 10B. Second candidate test 1014 includes a modified input value different to a corresponding input value of first candidate test 1012 shown in FIG. 10B. The modified input value is selected from prioritized list of candidate input values 1010.

The modified input value is selected from prioritized list of candidate input values 1010 by selecting the combination of candidate input values having the highest total priority with the condition that the combination has not been used in a previous candidate test. In the example shown in FIG. 10C, this condition means that the combination of input values used in first candidate test 1012 of FIG. 10B cannot be selected. Thus, an update unit, such as update unit 302, selects the combination comprising first candidate input value 1004-2 at position 2 in prioritized list of candidate input values 1010, second candidate input value 1006-1 at position 4 in prioritized list of candidate input values 1010, and third candidate input value 1008-1 at position 3 in prioritized list of candidate input values 1010. This combination has not been previously selected for a candidate test and the positional sum for this combination is 9, which, as stated above, corresponds to the combination of candidate input values with the highest priority.

As such, second candidate test 1014 corresponds to a modified form of first candidate test 1012 shown in FIG. 10B in that second candidate test 1014 includes a modified input value different to a corresponding input value of first candidate test 1012 shown in FIG. 10B, i.e. the input value for first input 1004 is modified from first candidate test 1012 shown in FIG. 10B to second candidate test 1014.

Second candidate test 1014 is executed and data relating to the execution is recorded. Based on the recorded data, one or more candidate input values are determined. However, in the example shown in FIG. 10C, none of the candidate input values are determined to have a sufficiently high priority to be added to prioritized list 1010.

Figure 10D:
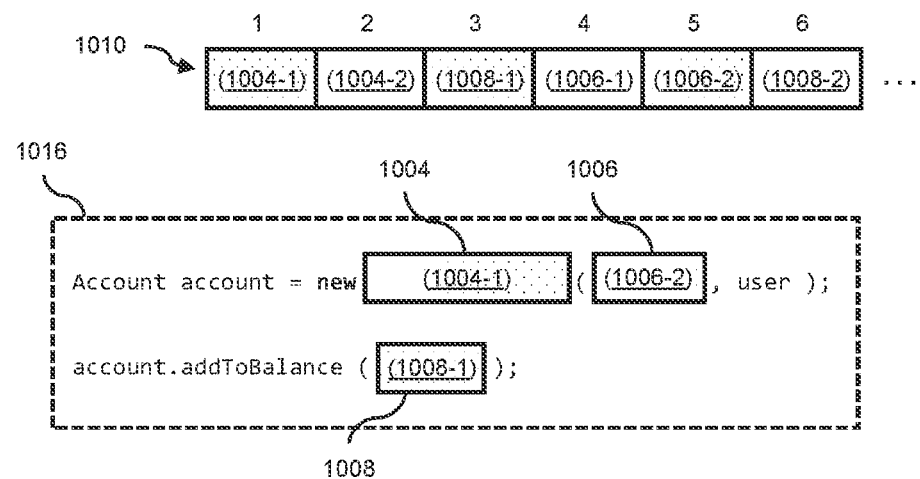

Second candidate test 1014 is then modified to create third candidate test 1016 shown in FIG. 10D.

FIG. 10D shows third candidate test 1016 created from second candidate test 1014 shown in FIG. 10C. Third candidate test 1016 includes a plurality of modified input values different to the plurality of input values of second candidate test 1014 shown in FIG. 10C. The plurality of modified input values are selected from prioritized list of candidate input values 1010.

The plurality of modified input values are selected from prioritized list of candidate input values 1010 by selecting the combination of candidate input values having the highest total priority with the condition that the combination has not been used in a previous candidate test. In the example shown in FIG. 10D, this condition means that the combination of input values used in first candidate test 1012 of FIG. 10B and the combination of input values used in second candidate test 1014 of FIG. 10C cannot be selected.

Thus, an update unit, such as update unit 302, selects the combination comprising first candidate input value 1004-1 at position 1 in prioritized list of candidate input values 1010, second candidate input value 1006-2 at position 5 in prioritized list of candidate input values 1010, and third candidate input value 1008-1 at position 3 in prioritized list of candidate input values 1010. This combination has not been previously selected for a candidate test and the positional sum for this combination is 9, which, as stated above, corresponds to the combination of candidate input values with the highest priority. Therefore, even though first candidate input value 1004-1 appeared in first candidate test 1012 shown in FIG. 10B it is included in third candidate test 1016 as it has not been used in combination with second candidate input value 1006-2 and third candidate input value 1008-1.

Third candidate test 1016 corresponds to a modified form of second candidate test 1014 shown in FIG. 10C in that third candidate test 1016 includes a plurality of modified input values different to the corresponding plurality of input values of second candidate test 1014 shown in FIG. 10C, i.e. the input values for first input 1004 and input 1006 are modified from second candidate test 1014 shown in FIG. 10C to third candidate test 1014.

Figure 10E:
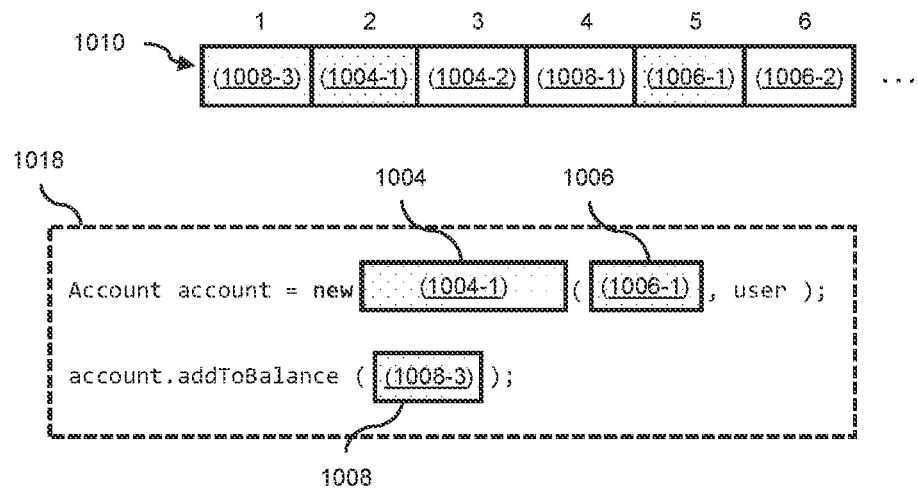

Third candidate test 1016 is executed and data relating to the execution is recorded. Based on the recorded data, one or more candidate input values are determined. As shown in FIG. 10E, this results in third candidate input value 1008-3 being added to prioritized list of candidate input values 1010.

Third candidate test 1016 is then modified to create fourth candidate test 1018 shown in FIG. 10E.

FIG. 10E shows fourth candidate test 1018 created from third candidate test 1016 shown in FIG. 10D. Fourth candidate test 1018 includes a plurality of modified input values different to the plurality of input values of third candidate test 1016 shown in FIG. 10D. The plurality of modified input values are selected from prioritized list of candidate input values 1010.

Advantageously, prioritized list of candidate input values 1010 has changed as a result of the execution of third candidate test 1016 shown in FIG. 10D. Specifically, as a result of the execution, third candidate input value 1008-3 has been added as the highest priority candidate input value such that it replaces first candidate input value 1004-1 at the head of prioritized list of candidate input values 1010.

As before, the plurality of modified input values are selected from prioritized list of candidate input values 1010 by selecting the combination of candidate input values having the highest total priority with the condition that the combination has not been used in a previous candidate test. In the example shown in FIG. 10E, this condition means that the combination of input values used in first candidate test 1012 of FIG. 10B, the combination of input values used in second candidate test 1014 of FIG. 10C and the combination of input values used in third candidate test 1016 of FIG. 10D cannot be selected.

Thus, an update unit, such as update unit 302, selects the combination comprising third candidate input value 1008-1 at position 1 in prioritized list of candidate input values 1010, first candidate input value 1004-1 at position 2 in prioritized list of candidate input values 1010, and second candidate input value 1006-1 at position 5 in prioritized list of candidate input values 1010. This combination has not been previously selected for a candidate test and the positional sum for this combination is 8, which, as stated above, corresponds to the combination of candidate input values with the highest priority.

Therefore, as a result of execution of third candidate test 1016 of FIG. 10D, a new candidate input value, i.e., third candidate input value 1008-1, has been determined and, in consequence of high priority associated with third candidate input value 1008-1, a new candidate test is created. Owing to the high priority of third candidate input value 1008-1, a new branch of candidate tests will be created and explored by the dynamic mutation-based fuzzing process.

Figure 10F:
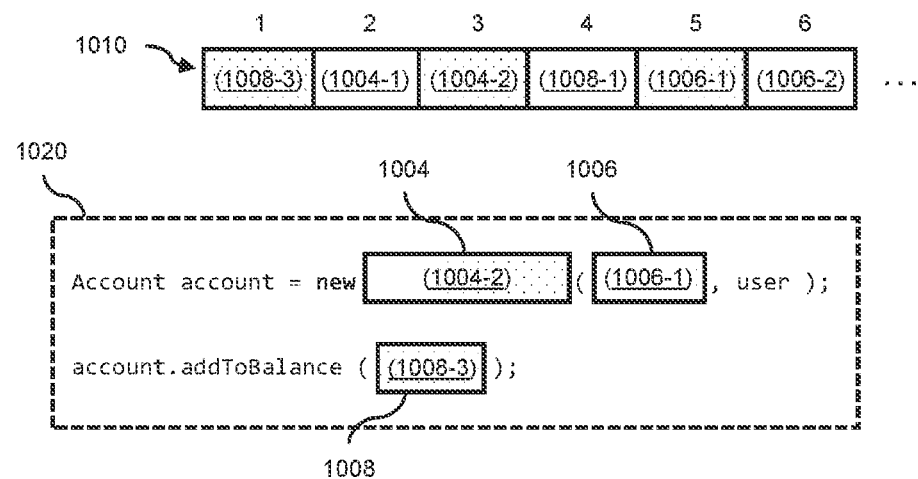

As shown in FIG. 10F, fifth candidate test 1020 created from fourth candidate test 1018 comprises a new combination of input values for first input 1004, second input 1006, and third input 1008.

The dynamic updating of prioritized list of candidate inputs 1010 as a result of executing a candidate test therefore allows a lazy tree-traversal of the space of possible candidate tests to be undertaken. That is, the space of all possible candidate tests does not need to be explicitly generated. Rather, dynamic mutation-based fuzzing allows for the space to be lazily traversed with updates to prioritized list of candidate input 1010 leading to expansion of choices for inputs. As illustrated in FIGS. 10A-F, initially the process was focused on expanding combinations related to first input 1004; however, as a result of a high priority candidate input value for third input 1008 being determined during execution, the possible combinations related to third input 1008 were then expanded and explored. Therefore, not only are realistic and context-aware input values identified, but the space of possible input values is efficiently explored thus allowing a wider range of candidate input values to be identified and considered.

Referring once again to FIG. 3, after update unit 302 has modified first candidate test 306 to create second candidate test 316, as illustrated in FIGS. 10B and 10C described above, a test associated with testable component is generated.

Test generation unit 304 is configured to generate test 322 associated with testable component 312 based on first candidate test 306 or second candidate test 316. In an embodiment, test generation unit 304 is configured to generate test 322 in parallel with update unit 302 performing the dynamic mutation-based fuzzing process.

First candidate test 306 represents a part of a unit test for testable component 312; specifically, an arrange section and an act section of a unit test. Similarly, second candidate test 316 represents an arrange section and an act section of a different unit test for testable component 312. In an embodiment, test generation unit 304 is further configured to generate an assert section for a candidate test such that a test can be generated from the candidate test.

Preferably, test generation unit 304 is configured to generate an assert section based on an execution of the candidate test.

FIG. 11 shows an arrange section and an act section of a candidate test.

The arrange section comprises program instructions 1102, 1104, and the act section comprises program instruction 1106. Program instruction 1102 has return value 1108 which is of type User. Program instruction 1104 has return value 1110 which is of type Account. Program instruction 1106 comprises a call to an instance method and has no explicit return value. As such, the result of program instruction 1106, if any, can be determined by a change of state of the account object. Execution of program instruction 1102 results in return object 1112. Execution of program instruction 1104 results in return object 1114. Execution of program instruction 1106 results in updated Account object 1116.

Test generation unit 304 is preferably configured to execute each program instruction 1102, 1104, 1106 to generate return objects 1112, 1114 and updated Account object 1116. Program instructions 1102, 1104, 1106, return objects 1112, 1114, and updated Account object 1116 are then used to generate an assert section for the candidate test. That is, test generation unit 304 preferably generates assertions by relating the code generated in the arrange section and the act section to what has been observed during execution of these sections.

Generally, an assertion generated by test generation unit 304 can be a type assertion, an exception assertion, or a value assertion etc. The skilled person will appreciate that the assertions generated by test generation unit 304 are not limited to only type assertions, exception assertions and value assertions, and other forms of assertion are equally applicable to the present disclosure.

A type assertion aims to verify that the type of a variable defined within the source code matches the dynamic type of the variable observed during execution. Test generation unit 304 is preferably configured to generate a type assertion by creating a program instruction which asserts that the static value of the variable is an instance of the dynamic type of the variable observed during execution. For example, consider an act section of the form, returnValue=procedureUnderTest( ). During execution, the object or variable returned by procedureUnderTest( ) was observed to be of type dynamictype. Therefore, an assertion generated by test generation unit 304 for this example would be of the form assert(returnValue instanceof dynamictype).

A value assertion aims to verify that the value of a variable defined within the source code matches the dynamic value of the variable observed during execution. If the static value of the variable is a primitive type (e.g., integer, float, byte, etc.), then the assertion is generated by asserting that the static value equals the value observed during execution. Continuing the previous example, if procedureUnderTest( ) was observed to return an integer value of "1234", then an assertion generated by test generation unit 304 for this example would be of the form assert(returnValue==1234).

If the static value, or return value, is an object and not a primitive type, then test generation unit 304 is configured to utilize observer methods to determine a primitive type to be checked. An observer method is a method of a class that returns the state of the class without altering that state. Common examples of observer methods include getter methods, size( ), toString( ), etc. Test generation unit 304 is preferably configured to call each observer method of an object observed during execution and, if the called observer method returns a primitive type, generate an assertion accordingly. If the called observer method returns an object and not a primitive type, then test generation unit 304 is configured to call each observer method of the returned object, and the observer method of any object of the arrange section potentially modified by the act call, and generate an assertion for each primitive type returned. This method of calling observer methods is repeated for each object returned until a primitive type is returned.

Once a primitive type has been returned by an observer method, test generation unit 304 is configured to generate an assertion by creating a program instruction which asserts that the call to the observer method matches the value of the primitive type observed during execution. For example, assert (returnValue.size( )==0), where "0" is the result of the call returnValue.size( ) observed during execution of an act section. In the example shown in FIG. 11, a value assertion related to the result of the act section associated with program instruction 1106 can be generated based on the observer methods of updated Account object 1116.

As such, test generation unit 304 is preferably configured to generate a plurality of possible assertions from an arrange section and act section. The plurality of possible assertions can include a plurality of possible type assertions and a plurality of possible value assertions. Accordingly, test generation unit 304 is preferably configured to select an assertion form the plurality of possible assertions to include as an assert section of a candidate test.

Preferably, the selection is guided by one or more heuristics. For example, selection can be performed by selecting an assertion which relates to the field written to, or changed during, execution of the act section. In the example shown in FIG. 11, the selected assertion would relate to a call to an observer method of updated Account object 1116 which reads the balance field (e.g., account.getBalance( ). Beneficially, this selection method uses a specific rules based approach that enables test generation unit 304 to mimic the human intuition that the assertion should check what was changed in the act section. This leads to more useful and comprehensive tests being generated by test generation unit 304 that, at times, can resemble the type of tests that a human developer would create without sacrificing computing resources directed toward low impact tests that provide minimal coverage.

Alternatively, assertion selection can be made based on a set of predetermined preferences which define that certain types of assertion are prioritized. For example, the predetermined preferences can state that asserting the size of a list is more interesting that asserting a hash code. The predetermined preferences can be determined such that the assertions generated are similar to assertions generated by a programmer of software developer.

In an embodiment, the predetermined preferences can be determined from a static analysis of one or more codebases. In such an embodiment, test generation unit 304 is configured to obtain static analysis data relating to first codebase 314 and offline static analysis data related to second codebase 320. Test generation unit 304 is configured to identify one or more assertion statements appearing within first codebase 314 and second codebase 320 from the static analysis data and offline static analysis data. The assertion statements are then parsed to determine an ordering of different assertion types based on the frequency that the different types of assertion appear within first codebase 314 and second codebase 320. The ordering is then used to determine the predetermined preferences, where more frequent assertion types (e.g., asserting cardinality) have a higher preference than less frequent assertion types (e.g., asserting hash codes). Therefore, assertions can be automatically generated to match the type of assertion that a programmer or software developer would use. System 300 is thus able to generate useful and realistic assertions automatically.

After an assert section has been generated for a candidate test, it is inserted into the candidate test. For example, an assert section can be generated for, and inserted into, first candidate test 306. Similarly, an assert section can be generated for, and inserted into, second candidate test 316. Test generation unit 304 is then configured to generate test 322 from first candidate test 306 or second candidate test 316.

To create generated test 322, test generation unit 304 is preferably configured to create a code section associated with generated test 322. In an embodiment, the code section is part of an existing suite or class of tests. Alternatively, the code section is created in isolation of any existing tests, e.g., as part of a new class. In this embodiment, a new class is created and named after the class that contains the testable component (e.g., for a testable component within a class "ClassA", a new class called "ClassATest" is created and the generated test is inserted therein). Test generation unit 304 is configured to create a procedure for the test within the code section. In an embodiment, the procedure is created according to a configurable template defining the structure of the procedure declaration. For example, the configurable template can define, within the relevant programming language, whether the test procedure should be public or private. As a further example, the configurable template can define whether any exceptions or errors occurring during execution of the test are passed on from the procedure. The procedure name is preferably determined by prefixing the word "test" to the name of the procedure under test (as shown in FIG. 2). Test generation unit 304 is configured to insert the elements of the test within the body of the created procedure. In an embodiment, this corresponds to inserting the arrange section, act section, and assert section of a candidate test into the body of the method created for generated test 322.

In an embodiment, test generation unit 304 is further configured to generate test 322 based on first candidate test 306 in accordance with a determination that first candidate test 306 satisfies a criterion. In a further embodiment, test generation unit 304 is configured to generate test 322 based on second candidate test 316 in accordance with a determination that second candidate test 316 satisfies a criterion. For ease of reference, the following description is made with reference to first candidate test 306. However, the criterion applied is equally applicable to second candidate test 316. As such, the skilled person will appreciate that references to first candidate test 306 in the following are also applicable to second candidate test 316.

Preferably, the criterion used to determine whether to generate test 322 based on first candidate test 306 is coverage based. That is, if first candidate test 306 achieves a new coverage of testable component 312 then generated test 322 is created from first candidate test 306. The coverage achieved by first candidate test 306 is preferably an edge coverage. Alternatively, the coverage achieved by first candidate test 306 can be a statement coverage, a condition coverage, a branch coverage, or the like.

In an embodiment, the coverage achieved by first candidate test 306 is recorded during execution of instrumented first candidate test. As described above, the data generated and recorded during execution of instrumented first candidate test can include coverage based information received from execution of instrumented testable component. This coverage based information can be used to determine the coverage achieved by first candidate test 306.

Figure 12:
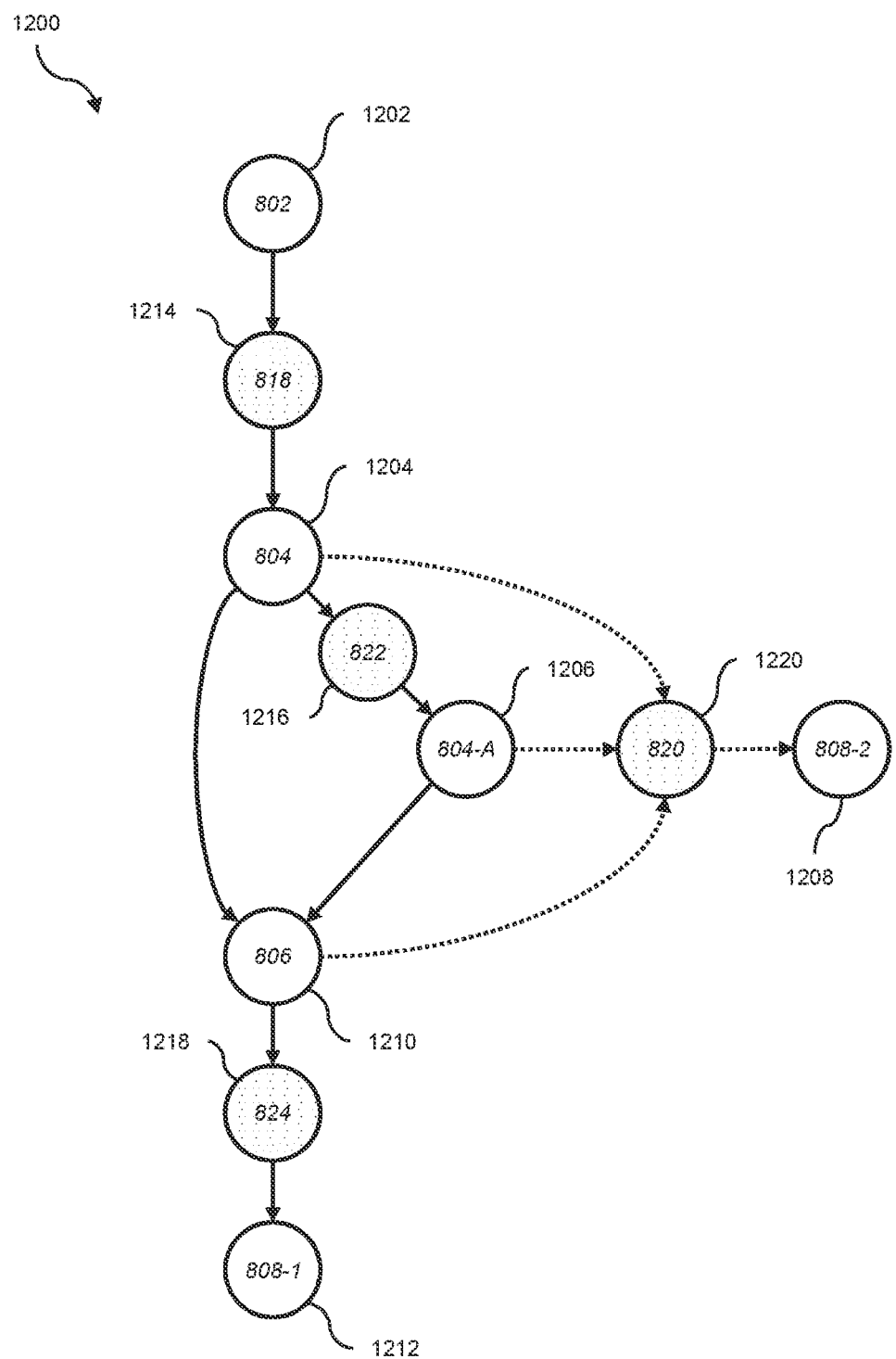
FIG. 12 illustrates how edge coverage is recorded during execution of an instrumented candidate test according to an embodiment.

FIG. 12 illustrates how edge coverage is recorded during execution of an instrumented candidate test.

FIG. 12 shows control flow graph 1200 which represents the different execution paths through an instrumented code section. For the purpose of example, control flow graph 1200 represents the different execution paths through instrumented code 816 which can be considered to be an instrumented form of a testable component, such as testable component 312 of FIG. 3.

Control flow graph 1200 comprises nodes 1202, 1204, 1206, 1208, 1210, 1212 associated with entry point 802 and code blocks 804, 804-A, 808-2, 806, 808-1 shown in code section 816 of FIG. 8B respectively. Control flow graph 1200 further comprises instrumentation nodes 1214, 1216, 1218, 1220 associated with instrumented code blocks 816, 822, 824, 820 shown in code section 816 of FIG. 8B respectively. The italicized integers within each node shown in FIG. 12 correspond to the integers of associated code blocks shown within FIG. 8B.

As shown in FIG. 8B, the instrumented code blocks, as represented by instrumentation nodes 514, 516, 518, 520, of FIG. 12 are inserted into the code section in order to intercept each possible execution flow through instrumented control flow graph 1200 and collect instrumentation data associated with the execution. Specifically, the nodes—and therefore the instrumented code—are inserted in order to ensure that the nodes cover all edges of control flow graph 1200. Since execution flow will always pass from node 1204 to node 1210 during execution (either directly or indirectly via node 1206), only the indirect path (i.e. node 1204 to node 1206) needs be instrumented.

The instrumented code blocks represented by instrumentation nodes 1214 and 1218 in control flow graph 1200, intercept and collect instrumentation data related to the entry and normal exit of the code section, i.e. entry point 802 and code block 808-1 of FIG. 8B respectively. The instrumented code block represented by instrumentation node 1216 in instrumented control flow graph 1200 intercepts and collects instrumentation data related to the conditional execution of code sub-block 804-A shown in FIG. 8A.

During execution, the code blocks represented with nodes 1204, 1206, 1210 may encounter an error and consequently raise an exception. The instrumented code block represented by instrumentation node 1220 in instrumented control flow graph 1200 intercepts and collects instrumentation data related to any exceptions raised by the code blocks represented by nodes 1204, 1206, 1210. The raised exceptions are then passed from the instrumented code block represented by instrumentation node 1220 to the code block represented by node 1208, which corresponds to exit point 808-1 of FIG. 8B.

Therefore, instrumentation of the testable component, as illustrated by control graph 1200, enables the edge coverage achieved by an execution of the instrumented testable component to be recorded and subsequently used to determine whether a test should be generated from the associated candidate test.

For example, execution of a first candidate test results in the node execution path 1202→1204→1210→1212. Execution of a second candidate test results in the node execution path 1202→1204→1206→1210→1212. As the coverage achieved by the second candidate test is different to the first candidate test, then the coverage criterion is met and a test is generated based on the second candidate test. However, a test would not be generated based on a third candidate test if execution of the third candidate test resulted in the node execution path 1202→1204→1210→1212 or node execution path 1202→1204→1206→1210→1212, since the coverage achieved by both execution paths has already been observed.

Referring once again to FIG. 3, either in parallel to the test generation process performed by test generation unit 304 described above, or after test generation unit 304 has generated test 322, update unit 302 is preferably configured to repeat the dynamic mutation-based fuzzing process described in relation to FIGS. 7 to 10 above.

Preferably, and as illustrated in FIGS. 10A-F above, after a first iteration of the dynamic mutation-based fuzzing process, update unit 302 is configured to obtain a first candidate test by obtaining the second candidate test created in the previous iteration of the dynamic mutation-based fuzzing process. That is, if first candidate test 306 and second candidate test 316 were created in a first iteration of the dynamic mutation-based fuzzing process, then second candidate test 316 will be used as a first candidate test in the second iteration of the dynamic mutation-based fuzzing process.

In an embodiment, the dynamic mutation-based fuzzing process continues to iterate until a termination criterion is met. Preferably, the termination criterion is met after a number of iterations of the dynamic mutation-based fuzzing process have been executed. Alternatively, the termination criterion is met after the dynamic mutation-based fuzzing process has been executed for a predetermined length of time. Alternatively, the termination criterion is met when prioritized list of candidate input values 328 is empty.

In an embodiment, system 300 further comprises segmentation unit 334 configured to identify a testable component from a codebase. As such, segmentation unit 334 is preferably configured to identify testable component 312 from within first codebase 314. Optionally, segmentation unit 334 is configured to identify a plurality of testable components (not shown) from within first codebase 314 for which a plurality of tests are to be generated. If a plurality of testable components are identified, then tests for each of the plurality of testable components can be generated by repeating the dynamic mutation-based fuzzing test generation process described above for each testable component.

Segmentation unit 334 identifies testable component 312 from within first codebase 314 based on a static code analysis performed on first codebase 314. Testable component 312 is identified as a part of first codebase 314 for which a test should be generated. Preferably, segmentation unit 334 segments first codebase 314 into a plurality of parts in order to determine which parts of first codebase 314 are suitable for test generation. In an embodiment, a part is defined as an instance method appearing within first codebase 314. Alternatively, a part is defined as any contiguous block of code appearing within first codebase 314.

In an embodiment, segmentation unit 334 is configured to extract all parts from first codebase 314 and identify a subset of parts suitable be used as testable components. Preferably, identification of the subset of parts is based on a part satisfying an inclusion criterion. In one embodiment, the inclusion criterion is based on the number of calls made to the part within other sections of first codebase 314. The inclusion criterion for a part is met if the number of calls made to the part exceeds a threshold. In an alternative embodiment, the inclusion criterion is based on whether the part calls any methods outside of first codebase 314. The inclusion criterion for a part is met if the part does make calls to external methods. Alternatively, the inclusion criterion for a part is met if the part does not make calls to external methods. In a further embodiment, the inclusion criterion is based on a user preference. For example, the user preference may specify an exclusion list such that constructors, getter methods, setter methods, toString methods, and the like are not included in the subset. The inclusion criteria for a part is met if the part is not a member of the exclusion list.

Figure 13:
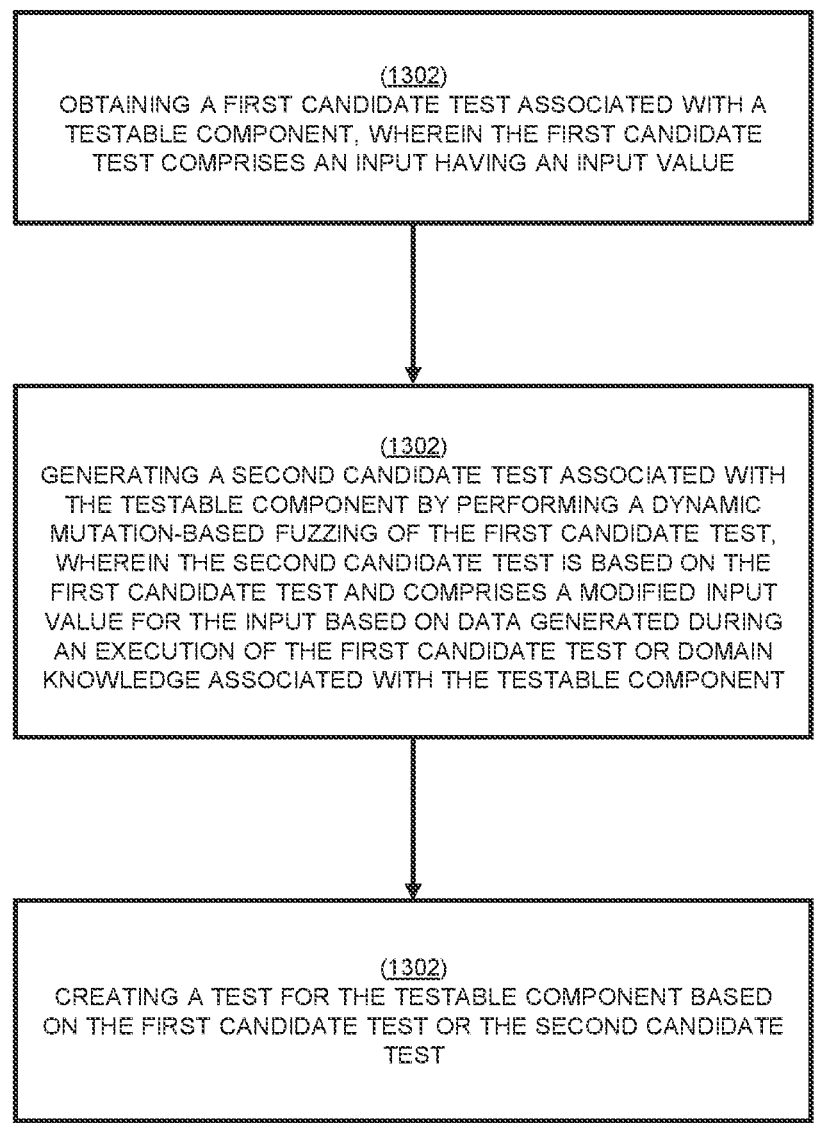
FIG. 13 shows a method for automatic software test generation according to an embodiment.

FIG. 13 shows method 1300 according to an embodiment. Method 1300 comprises steps 1302, 1304, 1306 that can be implemented, for example, as operations by a computing system including one or more computing devices. For example, one or more of steps 1302, 1304, and 1306 can be implemented by the computing system 100 of FIG. 1. The steps can be implemented as an algorithm run by the hardware of computing system 100.

Step 1302 comprises obtaining a first candidate test associated with a testable component, wherein the first candidate test comprises an input having an input value.

Step 1304 comprises generating a second candidate test associated with the testable component by performing a dynamic mutation-based fuzzing of the first candidate test, wherein the second candidate test is based on the first candidate test and comprises a modified input value for the input based on data generated during an execution of the first candidate test or domain knowledge associated with the testable component.

Step 1306 comprises creating a test for the testable component based on the first candidate test or the second candidate test.

Beneficially, the dynamic mutation-based fuzzing approach described above discovers candidate input values for use within a test by dynamically prioritizing candidate input values generated during execution and domain data. Unlike random fuzzing approaches, dynamic mutation-based fuzzing efficiently searches the space of candidate input values in order to identify candidate input values which may lead to realistic and useful tests being generated. Therefore, the tests automatically generated by the present disclosure have the benefit of appearing as though they are written by a human software developer whilst achieving broad coverage of the testable component.

Figure 14A:
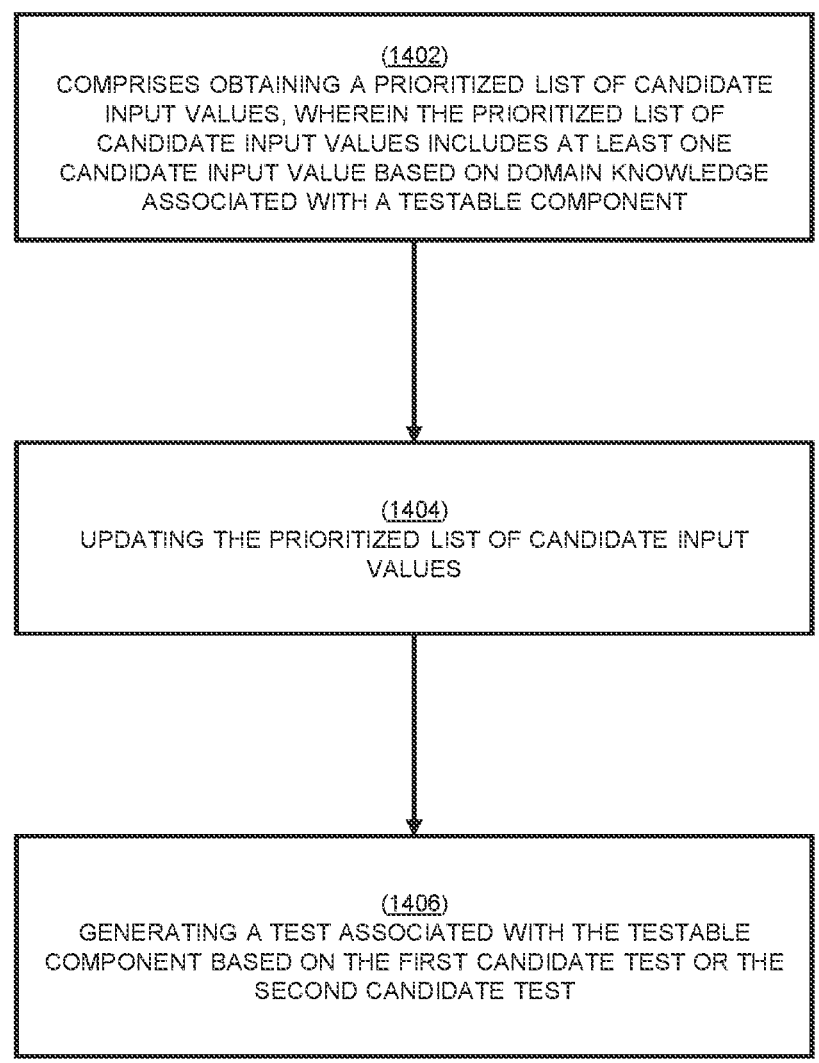
FIGS. 14A and 14B show a method for automatic software test generation according to an embodiment.

FIGS. 14A and B show method 1400 according to an embodiment. Method 1400 comprises steps 1402, 1404, 1406, 1408, 1410, 1412, 1416, 1418 that can be implemented, for example, by a computing system including one or more computing devices. For example, one or more of steps 1402, 1404, 1406, 1408, 1410, 1412, 1416, and 1418 can be implemented by the computing system 100 of FIG. 1 (e.g., as an algorithm run on the hardware of the computing system 100).

Step 1402 comprises obtaining a prioritized list of candidate input values, wherein the prioritized list of candidate input values includes at least one candidate input value based on domain knowledge associated with a testable component.

In an embodiment, the domain knowledge associated with the testable component includes analysis data associated with a first codebase and analysis data associated with a second codebase, wherein the first codebase includes the testable component.

In an embodiment, method 1400 further comprises performing a static analysis of the first codebase to determine analysis data associated with the first codebase. Preferably, method 1400 further comprises determining one or more candidate literal values and one or more candidate implementation types based on the analysis data associated with the first codebase. The modified input value is further based on the one or more candidate literal values or the one or more candidate implementation types determined from the analysis data associated with the first codebase.

In a further embodiment, method 1400 further comprises performing an offline static analysis of the second codebase to determine offline analysis data associated with the second codebase. Preferably, method 1400 further comprises determining one or more candidate literal values and one or more candidate implementation types based on the offline analysis data associated with the second codebase. The modified input value is further based on the one or more candidate literal values or the one or more candidate implementation types determined from the offline analysis data associated with the second codebase Step 1404 comprises updating the prioritized list of candidate input values. That is, step 1404 corresponds to performing the dynamic mutation-based fuzzing process shown in FIG. 14B. As such, step 1404 comprises performing the steps shown in FIG. 14B.

Step 1406 comprises generating a test associated with the testable component based on the first candidate test or the second candidate test.

Figure 14B:
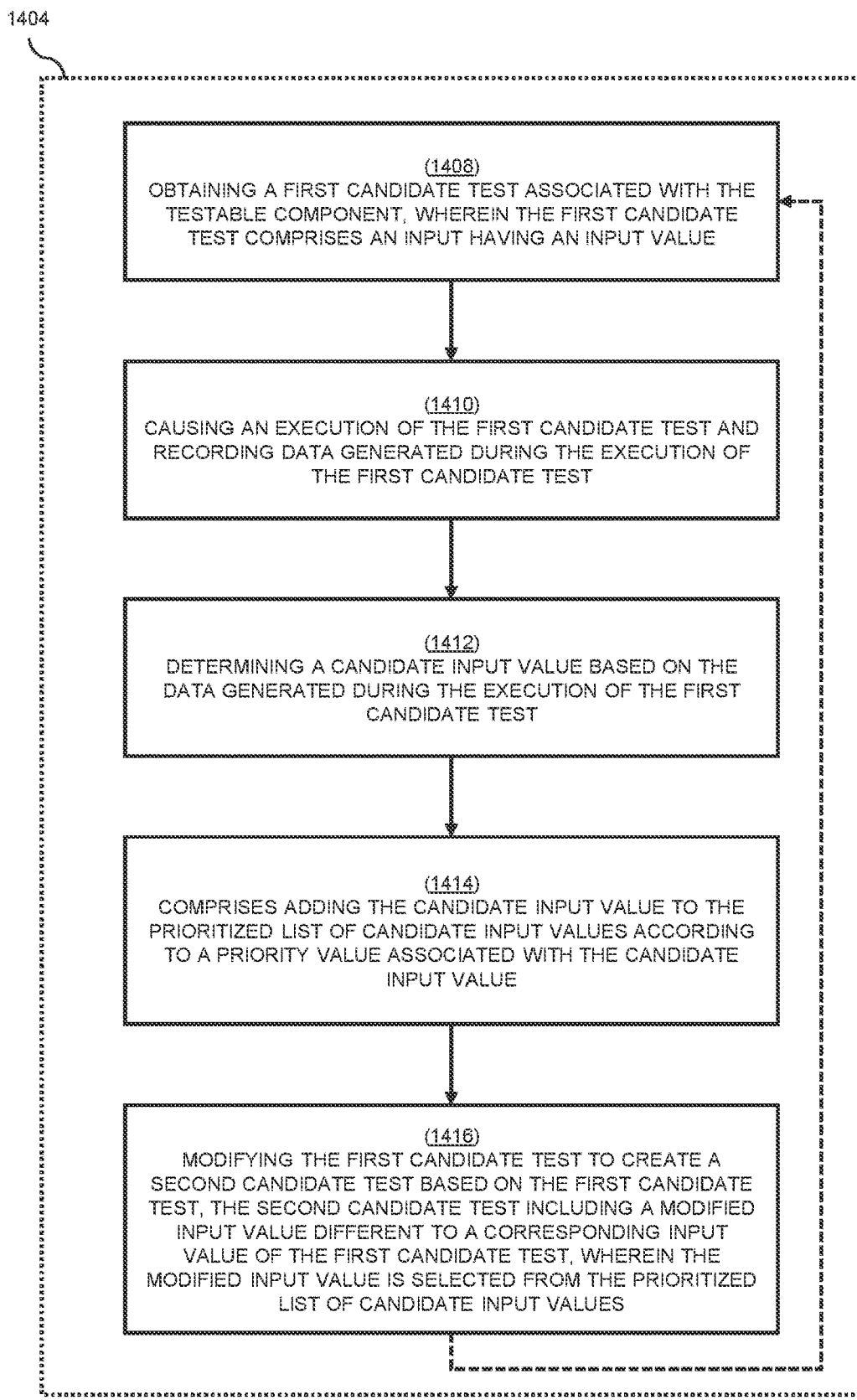

FIG. 14B shows the dynamic mutation-based fuzzing approach performed at step 1404 whereby the prioritized list of candidate input values is updated.

Step 1408 comprises obtaining a first candidate test associated with the testable component, wherein the first candidate test comprises an input having an input value.

Step 1410 comprises causing an execution of the first candidate test and recording data generated during the execution of the first candidate test.

In an embodiment, causing the execution of the first candidate test and recording data generated during the execution of the first candidate test further comprises instrumenting a first code section associated with the testable component to determine a first instrumented code section, wherein the first instrumented code collects and records data generated during the execution of the first candidate test Step 1412 comprises determining a candidate input value based on the data generated during the execution of the first candidate test.

Step 1414 comprises adding the candidate input value to the prioritized list of candidate input values according to a priority value associated with the candidate input value. Preferably, prior to adding the candidate input value to the prioritized list of candidate input values, method 1400 further comprises determining the priority value associated with the candidate input value. In an embodiment, the priority value is based on the data generated during the execution of the first candidate test and/or the domain knowledge associated with the testable component.

Step 1416 comprises modifying the first candidate test to create a second candidate test based on the first candidate test, the second candidate test including a modified input value different to a corresponding input value of the first candidate test, wherein the modified input value is selected from the prioritized list of candidate input values.

Steps 1408 to 1416 can be repeated until a termination criterion is met. Preferably, the termination criterion is met after a number of iterations of the dynamic mutation-based fuzzing process have been executed. Alternatively, the termination criterion is met after the dynamic mutation-based fuzzing process has been executed for a predetermined length of time. Alternatively, the termination criterion is met when the prioritized list of candidate input values is empty.

Beneficially, the generation of tests based on static data and dynamic data discovered during execution of a dynamic mutation-based fuzzing process provides an improved and more realistic automatic test generation method. Realistic and useful input values are automatically and efficiently discovered and incorporated into generated tests. In this way, the computer-implemented method accumulates and utilizes newly available information such as, for example, domain knowledge and dynamic analysis data to provide a practical improvement to software testing technology. Moreover, the computer-implemented method makes efficient use of data generated during execution by guiding the dynamic mutation-based fuzzing process based on a dynamic prioritization of candidate input values such that higher priority candidate input values are explored and potentially incorporated into automatically generated tests.

What is claimed is:

1. A computer-implemented method comprising:
performing a static analysis of a first codebase to determine analysis data associated with the first codebase;
obtaining a prioritized list of candidate input values, wherein the prioritized list of candidate input values includes at least one candidate input value based on domain knowledge associated with a testable component, wherein the domain knowledge associated with the testable component includes the analysis data associated with the first codebase and analysis data associated with a second codebase, wherein the first codebase includes the testable component;
determining one or more candidate literal values and one or more candidate implementation types based on the analysis data associated with the first codebase;
updating the prioritized list of candidate input values by:
obtaining a first candidate test associated with the testable component, wherein the first candidate test comprises an input having an input value;

causing an execution of the first candidate test and recording data generated during the execution of the first candidate test;
determining a candidate input value based on the data generated during the execution of the first candidate test;
adding the candidate input value to the prioritized list of candidate input values according to a priority value associated with the candidate input value; and
modifying the first candidate test to create a second candidate test based on the first candidate test, the second candidate test including a modified input value different to a corresponding input value of the first candidate test, wherein the modified input value is selected from the prioritized list of candidate input values, wherein the modified input value is further based on the one or more candidate literal values or the one or more candidate implementation types determined from the analysis data associated with the first codebase; and
generating a test associated with the testable component based on the first candidate test or the second candidate test.

2. A computer-implemented method comprising:
performing an offline static analysis of a first codebase to determine offline analysis data associated with the first codebase;
obtaining a prioritized list of candidate input values, wherein the prioritized list of candidate input values includes at least one candidate input value based on domain knowledge associated with a testable component, wherein the domain knowledge associated with the testable component includes the offline analysis data associated with the first codebase and analysis data associated with a second codebase, wherein the second codebase includes the testable component;
determining one or more candidate literal values and one or more candidate implementation types based on the offline analysis data associated with the first codebase;
updating the prioritized list of candidate input values by:
 obtaining a first candidate test associated with the testable component, wherein the first candidate test comprises an input having an input value;
 causing an execution of the first candidate test and recording data generated during the execution of the first candidate test;
 determining a candidate input value based on the data generated during the execution of the first candidate test;
 adding the candidate input value to the prioritized list of candidate input values according to a priority value associated with the candidate input value; and
 modifying the first candidate test to create a second candidate test based on the first candidate test, the second candidate test including a modified input value different to a corresponding input value of the first candidate test, wherein the modified input value is selected from the prioritized list of candidate input values, wherein the modified input value is further based on the one or more candidate literal values or the one or more candidate implementation types determined from the offline analysis data associated with the first codebase; and
generating a test associated with the testable component based on the first candidate test or the second candidate test.

3. The computer-implemented method of claim 2, wherein causing the execution of the first candidate test and recording data generated during the execution of the first candidate test further comprises:
instrumenting a first code section associated with the testable component to determine a first instrumented code section, wherein the first instrumented code collects and records data generated during the execution of the first candidate test.

4. The computer-implemented method of claim 2, further comprising, prior to adding the candidate input value to the prioritized list of candidate input values:
determining the priority value associated with the candidate input value.

5. The computer-implemented method of claim 4, wherein the priority value is based on the data generated during the execution of the first candidate test and/or the domain knowledge associated with the testable component.

6. The computer-implemented method of claim 2, wherein the method further comprises repeating the steps of updating and generating until a termination criteria is met.

7. A system comprising:
one or more processors; and
one or more non-transitory computer-readable media that collectively store instructions that, when executed by the one or more processors, cause the system to perform operations, the operations comprising:
 performing a static analysis of a first codebase to determine analysis data associated with the first codebase;
 obtaining a prioritized list of candidate input values, wherein the prioritized list of candidate input values includes at least one candidate input value based on a domain knowledge associated with a testable component, wherein the domain knowledge associated with the testable component includes the analysis data associated with the first codebase and analysis data associated with a second codebase, wherein the first codebase includes the testable component;
 determining one or more candidate literal values and one or more candidate implementation types based on the analysis data associated with the first codebase;
 obtaining a first candidate test associated with the testable component, wherein the current candidate test comprises an input having an input value;
 causing an execution of the first candidate test and recording data generated during the execution of the first candidate test;
 determining a candidate input value based on the data generated during the execution of the first candidate test;
 adding the candidate input value to the prioritized list of candidate input values according to a priority value associated with the candidate input value;
 modifying the first candidate test to create a second candidate test based on the first candidate test, the second candidate test including a modified input value different to a corresponding input value of the first candidate test, wherein the modified input value is selected from the prioritized list of candidate input values, wherein the modified input value is further based on the one or more candidate literal values or the one or more candidate implementation types determined from the analysis data associated with the first codebase; and generating a test associated with the testable component based on the first candidate test or the second candidate test.

8. The system of claim 7, wherein the operations further comprise:
performing an offline static analysis of the second codebase to determine offline analysis data associated with the second codebase;
wherein determining one or more candidate literal values and one or more candidate implementation types is further based on the offline analysis data associated with the second codebase; and
wherein the modified input value is further based on the one or more candidate literal values or the one or more candidate implementation types determined from the offline analysis data associated with the second codebase.

9. The system of claim 7, wherein the operations further comprise: instrumenting a first code section associated with the testable component to determine a first instrumented code section, wherein the first instrumented code collects and records data generated during the execution of the first candidate test.

10. The system of claim 7, wherein the test is generated based on the first candidate test in accordance with a determination that the first candidate test satisfies a criterion.

11. The system of claim 7, wherein the test is generated based on the second candidate test in accordance with a determination that the second candidate test satisfies a criterion.

12. The system of claim 7, wherein the operations further comprise determining the priority value associated with the candidate input value, wherein the priority value is based on the data generated during the execution of the first candidate test and/or the domain knowledge associated with the testable component.

13. A non-transitory computer readable medium comprising one or more instructions which when executed by one or more processors cause a device to carry out operations as set forth in the method of claim 2.

* * * * *